United States Patent [19]
Ikegami

[11] Patent Number: 5,313,314
[45] Date of Patent: May 17, 1994

[54] METHOD FOR TRANSFORMING COLOR SIGNAL AND APPARATUS FOR EXECUTING THE METHOD

[75] Inventor: Hiroaki Ikegami, Kanagawa, Japan

[73] Assignee: Fuji Xerox Co., Ltd., Tokyo, Japan

[21] Appl. No.: 962,351

[22] Filed: Oct. 16, 1992

[30] Foreign Application Priority Data

Oct. 17, 1991 [JP] Japan ................................ 3-296660

[51] Int. Cl.$^5$ ............................................. H04N 1/46
[52] U.S. Cl. .................................... 358/518; 358/520
[58] Field of Search ........................... 358/518–525, 358/515

[56] References Cited
U.S. PATENT DOCUMENTS

| | | | |
|---|---|---|---|
| 4,745,466 | 5/1988 | Yoshida et al. | 358/518 |
| 4,876,589 | 10/1989 | Orsburn et al. | 358/520 |
| 5,077,605 | 12/1991 | Ikeda et al. | 358/521 |

*Primary Examiner*—Stephen Brinich
*Attorney, Agent, or Firm*—Finnegan, Henderson, Farabow, Garrett & Dunner

[57] ABSTRACT

A color signal transforming apparatus which is operable at high speed for four input signals including three color signals and a control signal for K, without increasing the memory capacity not so much. In the apparatus, each of four input signals is divided into the higher bits and the lower bits, so that the higher bits are combined to form basic data and the combined higher bits and lower bits are combined to form interpolation data. The combination of the higher bits and the interpolation data are calculated together to produce output signals. A 16-vertex body of each object to be interpolated is divided into twenty-four 5-vertex bodies each passing through one of sixteen lattice points constituting the 16-vertex body, and the different combinations of interpolation data is assigned to the 5-vertex bodies in one-to-one correspondence manner.

9 Claims, 14 Drawing Sheets

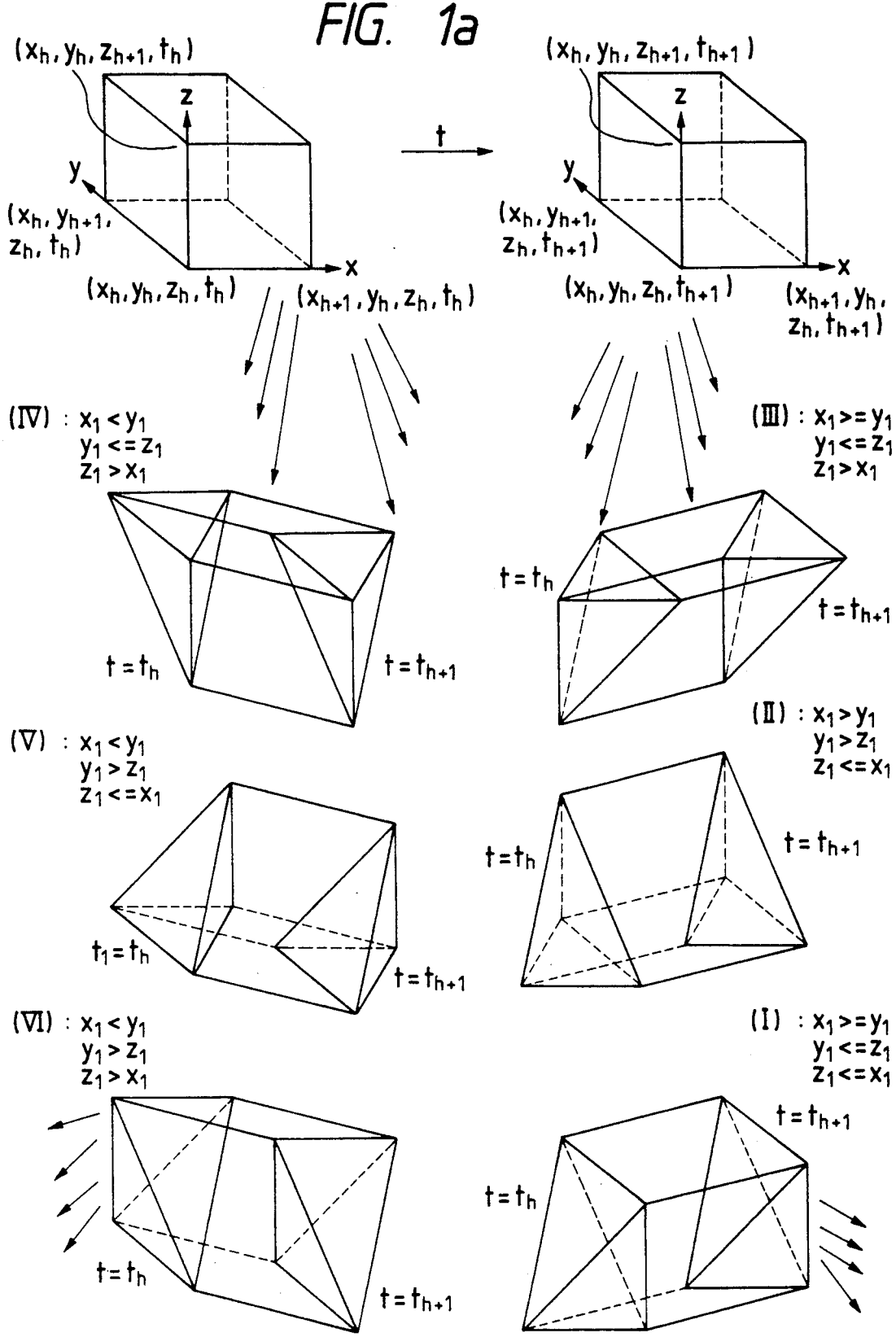

(VI)
$x_1 < y_1$
$y_1 > z_1$
$z_1 > x_1$ $t = t_h$
$t = t_{h+1}$ (VI - VII)
$x_1 < y_1$
$y_1 > z_1$
$z_1 > x_1$
$x_1 > t_1$
$y_1 > t_1$
$z_1 > t_1$ (VI - VI)
$x_1 < y_1$
$y_1 > z_1$
$z_1 > x_1$
$x_1 <= t_1$
$y_1 > t_1$
$z_1 > t_1$ (VI - V)
$x_1 < y_1$
$y_1 > z_1$
$z_1 > x_1$
$x_1 <= t_1$
$y_1 > t_1$
$z_1 <= t_1$ (VI - VIII)
$x_1 < y_1$
$y_1 > z_1$
$z_1 > x_1$
$x_1 <= t_1$
$y_1 <= t_1$
$z_1 <= t_1$

METHOD FOR TRANSFORMING COLOR SIGNAL AND APPARATUS FOR EXECUTING THE METHOD

BACKGROUND OF THE INVENTION

1. Field of the Invention

The present invention relates to a method for inputting and outputting signals representative of full color containing half-tone, which are used for a color printer, color copying machine, or the like, and an apparatus for executing the method. More particularly, the invention relates to a method for transforming color signals in order to reproduce a color faithfully, and an apparatus for executing the method.

2. Description of the Related Art

In the fields of color printing, color television, color copying machine, and the like, there are many proposals to transform color signals. In a typical example of those proposals, an input color space, e.g., a BGR coordinate, is directly transformed into an output color space, e.g., a YMC (K) coordinate by using a table memory. When three color signals in a BGR coordinate, for example, are transformed into digital signals at resolutions of the necessary gray levels, a great amount of table data is needed. To store the data, a table memory with a large memory capacity must be provided. Such a memory is very expensive.

For example, in a case where each of the input colors B, G, and R are expressed by 8 bits, and the output colors Y, M, C, and K are also expressed by 8 bits, the required memory capacity of the table memory is $2^{24} \times 4$ bytes. It is impractical to use such a big table memory.

Many interpolation basis methods have been studied for reducing the necessary memory capacity in transforming color signals by using the table memory. In these methods, a color correction memory addressed with the higher bits of the input signals is used for reducing the necessary memory capacity. The coarsened data is corrected by using an interpolation circuit using the lower bits. The interpolation basis method is disclosed, for example, in Published Unexamined Patent Application No. Hei 2187374 and Examined Japanese Patent Application No. Sho. 58-16180. But, this interpolation is discontinuous at the boundary between the adjacent interpolation regions.

To solve the above problems, the inventor of the present Patent Application proposes in a co-pending U.S. Patent Application Serial No. (unknown) filed on the same day as the present Patent Application was filed.

The interpolation method of the co-pending application will be described with reference to FIG. 9 and an equation (1).

$$X'(x, y, z) = X'(x_h, y_h, z_h) + a_x(x_h, y_h, z_h, d_x((x_1, y_1, z_1))x_1 + \quad (1)$$
$$a_y(x_h, y_h, z_h, d_y(x_1, y_1, z_1))y_1 + a_z(x_h, y_h, z_h, d_z(x_1, y_1, z_1))z_1$$

where $X'(x, y, z)$: a value of one output for an input $(x, y, z)$ $x_h, y_h, z_h$: higher bits of the input signals $x_1, y_1, z_1$: lower bits of the input signals $X'(x_h, y_h, z_h)$: basic data obtained from the combination of the higher bits $a_x(x_h, y_h, z_h, d_x(x_1, y_1, z_1))$, $a_y(x_h, y_h, z_h, d_y(x_1, y_1, z_1))$, $a_z(x_h, z_h, d_z(x_1, y_1, z_1))$: interpolation sensitivity signals $d_x(x_1, y_1, z_1), d_y(x_1, y_1, z_1), d_z(x_1, y_1, z_1)$:

interpolation region select signals obtained from the combination of the lower bits The operation of the color signal transforming apparatus shown in FIG. 9 will be described briefly.

Three input signals for instance, L*, a*, and b* representing colors are each divided into the higher bits and the lower bits. The combination of the higher bits is input as an address signal to a color correction memory 1 for basic data, which then outputs basic data corresponding to $X'(x_h, y_h, z_h)$.

The combination of the lower bits is input as an address signal to the interpolation region select memory 7, which outputs the interpolation region select signals corresponding to $d_x(x_1, y_1, z_1), d_y(x_1, y_1, z_1, ), d_z(x_1, y_1, z_1)$.

The combination of the higher bits of the input signals corresponding to $d_x(x_1, y_1, z_1), d_y(x_1, y_1, z_1), d_z(x_1, y_1, z_1)$.

The combination of the higher bits of the input signals and some of the interpolation region select signals are input to interpolation sensitivity signal output memories $5_1$, $5_2$, and $5_3$, which then output interpolation sensitivity signals corresponding to $a_x(x_h, y_h, z_h, d_x(x_1, y_1, z_1))$, $a_y(x_h, y_h, z_h, d_y(x_1, y_1, z_1))$, and $a_z(x_h, y_h, z_h, d_z(x_1, y_1, z_1))$.

The interpolation sensitivity signals are respectively input to interpolation multipliers $6_1$ to $6_3$ where these are multiplied by the lower bits of the input signals, respectively. The multipliers produce the resultant products in the form of plural interpolation data.

Finally, interpolation adders $3_1$ to $3_3$ respectively add the basic data and the plural interpolation data. The resultant sums are output as interpolated values corresponding to $X'(x, y, z)$ in the equation (1).

The interpolation method has the following advantageous features:

(1) Complicated address calculation is not required when the memory is accessed. High speed processing is possible with a simple circuit arrangement.

(2) The regular arrangement in the color correction memory is not essential. The technique of the invention is compatible with the technique, which removes the memory portion out of the color reproduction regions by arranging irregularly the data that are regularly arranged in the memory (Published Unexamined Japanese Patent Application Nos. Hei. 2-73779 and 2-187374).

(3) Interpolation continuity at the boundary region is secured.

The interpolation method as mentioned above is incapable of handling such a case where a quantity of black K is intended to be variable according to the input characteristics, not fixedly set for the whole color space, when the output signals are color signals of Y, M, C, and K.

The problem will be described specifically.

When four color signals of Y, M, C, and K are output to an output device, such as a xerography machine, in view of the graininess on an image, a picture area contains black K preferably at the smallest possible quantity. In view of the miss registration, character portion contains black K preferably at the largest possible quantity.

In an extreme case, the picture area is output with three colors Y, M and C, while the character portion is output with any of the combinations of two colors and black K, such as the combination of Y, M and K, the combination of M, C, and K, and the combination of C, Y, and K. Practically, it has been desired to realize the output color combinations moderate but closer to those of the extreme case.

To secure a continuity of image at the boundary regions when the percentage of black K contained is changed, it is preferable to increase the number of the moderate color combinations as large as possible.

The attempt to realize this by modifying the interpolation method proposed in the co-pending application as stated above may be categorized into the following two:

(1) The basic data color correction memory and the interpolation sensitivity signal output memory are constructed with reprogrammable memories. When another percentage of the contained black K is required, the content of the memory is replaced with the percentage.

(2) As shown in FIG. 10, a K-control input is additionally used for the addresses of the color correction memory and the interpolation sensitivity signal output memories, as shown in FIG. 10.

The above two attempts have the following problems, however. In the case of (1), the memory content replacement takes much time. When it is necessary to change the percentage of the contained black K in one image, the replacing operation time will be too long time for printing. In the case of (2), when the number of bits of the K control input signal is increased, that is, the number of percentages of the contained K, is increased, the memory capacities of the color correction memory and the interpolation sensitivity signal output memories must be increased by the amount corresponding to the increased number. This leads to increase of the cost to manufacture.

SUMMARY OF THE INVENTION

For the above background reasons, the present invention has a first object to provide a color signal transforming apparatus which is operable at high speed for four input signals including three color signals and a control signal for K, without increasing the memory capacity not so much.

In addition to the above color conversion of the four input signals including three color signals and a control signal for K, the present invention is operable for transforming four color input signals of Y, M, C, and K, for example, into other color signals.

The present invention has the same advantages as those of the method and apparatus for transforming color signals that are proposed by the above-stated co-pending application. Accordingly, another object of the present invention is to provide a method for transforming color signal and an apparatus for executing the same, which have the above-described advantageous features (1) to (3).

A method for transforming color signals in which four input signals are each divided into the higher bits and the lower bits, the higher bits are combined to form basic data, the lower bits are combined to form interpolation data, and the combination of the higher bits and the interpolation data are added together, thereby to form output signals, in which a 16-vertex body of each object to be interpolated is divided into twenty-four 5-vertex bodies each passing through one of sixteen lattice points constituting the 16-vertex body, and the different combinations of interpolation data are assigned to the 5-vertex bodies in one-to-one correspondence manner.

The technical idea of the color signal transforming method may be mathematically expressed by $$X'(x, y, z, t) = X'(x_h, y_h, z_h, t_h) + \quad (2)$$
$$a_x(x_h, y_h, z_h, t_h, d_x((x_1, y_1, z_1, t_1))x_1 +$$
$$a_y(x_h, y_h, z_h, t_h, d_y((x_1, y_1, z_1, t_1))y_1 +$$
$$a_z(x_h, y_h, z_h, t_h, d_z((x_1, y_1, z_1, t_1))z_1 +$$
$$a_t(x_h, y_h, z_h, t_h, d_t((x_1, y_1, z_1, t_1))t_1$$
$$= X'(x_h, y_h, z_h, t_h) +$$
$$c(b_x(x_h, y_h, z_h, t_h, d_x((x_1, y_1, z_1, t_1)), x_1) +$$
$$c(b_y(x_h, y_h, z_h, t_h, d_y((x_1, y_1, z_1, t_1)), y_1) +$$
$$c(b_z(x_h, y_h, z_h, t_h, d_z((x_1, y_1, z_1, t_1)), z_1) +$$
$$c(b_t(x_h, y_h, z_h, t_h, d_t((x_1, y_1, z_1, t_1)), t_1)$$
$$= X'(x_h, y_h, z_h, t_h) +$$
$$a_x(e_x(x_h, y_h, z_h, t_h, d_x((x_1, y_1, z_1, t_1))x_1 +$$
$$a_y(e_y(x_h, y_h, z_h, t_h, d_y(x_1, y_1, z_1, t_1))y_1 +$$
$$a_z(e_z(x_h, y_h, z_h, t_h, d_z(x_1, y_1, z_1, t_1))z_1 +$$
$$a_t(e_t(x_h, y_h, z_h, t_h, d_t(x_1, y_1, z_1, t_1))t_1$$
$$= X'(x_h, y_h, z_h, t_h) +$$
$$c(b_x(e_x(x_h, y_h, z_h, t_h, d_x((x_1, y_1, z_1, t_1)), x_1) +$$
$$c(b_y(e_y(x_h, y_h, z_h, t_h, d_y(x_1, y_1, z_1, t_1)), y_1) +$$
$$c(b_z(e_z(x_h, y_h, z_h, t_h, d_z(x_1, y_1, z_1, t_1)), z_1) +$$
$$c(b_t(e_t(x_h, y_h, z_h, t_h, d_t(x_1, y_1, z_1, t_1)), t_1)$$

where $X'(x, y, z, t)$: a value of one output for an input $(x, y, z, t)$ $x_h, y_h, z_h, t_h$: higher bits of the input signals $x_1, y_1, z_1, t_1$: lower bits of the input signals $X'(x_h, y_h, z_h, t_h)$: basic data obtained from the combination of the higher bits.

$a_x(x_h, y_h, z_h, t_h, d_x((x_1, y_1, z_1, t_1)))$, $a_y(z_h, y_h, z_h, t_h, d_y(x_1, y_1, z_1, t_1))$, $a_z(x_h, y_h, z_h, t_h, d_z(x_1, y_1, z_1, t_1))$, $a_t(x_h, y_h, z_h, t_h, d_t(x_1, y_1, z_1, t_1))$, $a_x(e_x(x_h, y_h, z_h, t_h, d_x((x_1, y_1, z_1, t_1)))$, $a_y(e_y(x_h, y_h, z_h, t_h, d_y(x_1, y_1, z_1, t_1)))$, $a_z(e_z(x_h, y_h, z_h, t_h, d_z(x_1, y_1, z_1, t_1)))$, and $a_t(e_t(x_h, y_h, z_h, t_h, d_t(x_1, y_1, z_1, t_1)))$ indicate interpolation sensitivity signals.

$b_x(x_h, y_h, z_h, t_h, d_x((x_1, y_1, z_1, t_1)))$, $b_y(x_h, y_h, z_h, t_h, d_y(x_1, y_1, z_1, t_1))$, $b_z(x_h, y_h, z_h, t_h, d_z(x_1, y_1, z_1, t_1))$, $b_t(x_h, y_h, z_h, t_h, d_t(x_1, y_1, z_1, t_1))$, $b_x(e_x(x_h, y_h, z_h, t_h, d_x((x_1, y_1, z_1, t_1)))$, $b_y(e_y(x_h, y_h, z_h, t_h, d_y(x_1, y_1, z_1, t_1)))$, $b_z(e_z(x_h, y_h, z_h, t_h, d_z(x_1, y_1, z_1, t_1)))$, and $b_t(e_t(x_h, y_h, z_h, t_h, d_t(x_1, y_1, z_1, t_1)))$ indicate interpolation sensitivity select signals.

$c(b_x(x_h, y_h, z_h, t_h, d_x((x_1, y_1, z_1, t_1)), x_1)$, $c(b_y(x_h, y_h, z_h, t_h, d_y(x_1, y_1, z_1, t_1)), y_1)$, $c(b_z(x_h, y_h, z_h, t_h, d_z(x_1, y_1, z_1, t_1)), z_1)$, $c(b_t(x_h, y_h, z_h, t_h, d_t(x_1, y_1, z_1, t_1)), t_1)$, $c(b_x(e_x(x_h, y_h, z_h, t_h, d_x((x_1, y_1, z_1, t_1)), x_1)$, $c(b_y(e_y(x_h, y_h, z_h, t_h, d_y(x_1, y_1, z_1, t_1)), y_1)$, $c(b_z(e_z(x_h, y_h, z_h, t_h, d_z(x_1, y_1, z_1, t_1)), z_1)$, and $c(b_t(e_t(x_h, y_h, z_h, t_h, d_t(x_1, y_1, z_1, t_1)), t_1)$ indicate interpolation data signals.

$d_x(x_1, y_1, z_1, t_1)$, $d_y(x_1, y_1, z_1, t_1)$, $d_z(x_1, y_1, z_1, t_1)$, and $d_t(x_1, y_1, z_1, t_1)$ indicate interpolation region select signals obtained from the combination of the lower-order bits.

$e_x(x_h, y_h, z_h, t_h)$, $e_y(x_h, y_h, z_h, t_h)$, $e_z(x_h, y_h, z_h, t_h)$, and $e_t(x_h, y_h, z_h, t_h)$ represent difference data corresponding to fifteen lattice points as the remaining lattice points when one of the sixteen lattice points of each 16-vertex body as the interpolated region is a reference point.

A specific example of the dividing method is shown in FIG. 1. Interpolation sensitivity signals $a_x, a_y, a_z, a_t$ in the dividing method is shown in Tables 1 and 2.

TABLE 1

Unit 16-Vertex Body Dividing Method

| Region No. | $X_1 \geq y_1$ | $y_1 > z_1$ | $z_1 > x_1$ | $x_1 > t_1$ | $y_1 > t_1$ | $z_1 > t_1$ | $z_1 > x_1$, $x_1 \geq y_1$, $x_1 > t_1$ | $x_1 \geq y_1$, $y_1 > z_1$, $y_1 > t_1$ | $y_1 > z_1$, $z_1 > x_1$, $z_1 > t_1$ | $x_1 > t_1$, $y_1 > t_1$, $z_1 > t_1$ |
|---|---|---|---|---|---|---|---|---|---|---|
| {1-1} | (1) | 0 | 0 | 1 | 0 | 0 | 011 | 100 | 000 | 100 |
| {1-3} | (1) | 0 | 0 | 1 | 0 | 1 | 001 | 100 | 001 | 101 |
| {1-7} | (1) | 0 | 0 | 1 | 1 | 1 | 001 | 101 | 001 | 111 |
| {1-8} | (1) | 0 | 0 | 0 | 0 | 0 | 010 | 100 | 000 | 000 |
| {2-1} | 1 | 1 | (0) | 1 | 0 | 0 | 001 | 110 | 100 | 100 |
| {2-2} | 1 | 1 | (0) | 1 | 1 | 0 | 001 | 111 | 100 | 110 |
| {2-7} | 1 | 1 | (0) | 1 | 1 | 1 | 001 | 111 | 101 | 111 |
| {2-8} | 1 | 1 | (0) | 0 | 0 | 0 | 010 | 110 | 100 | 000 |
| {3-3} | 1 | (0) | 1 | 1 | 0 | 1 | 111 | 100 | 011 | 101 |
| {3-4} | 1 | (0) | 1 | 0 | 0 | 1 | 110 | 100 | 011 | 001 |
| {3-7} | 1 | (0) | 1 | 1 | 1 | 1 | 111 | 101 | 011 | 111 |
| {3-8} | 1 | (0) | 1 | 0 | 0 | 0 | 110 | 100 | 010 | 000 |
| {4-4} | 0 | 0 | (1) | 0 | 0 | 1 | 100 | 000 | 011 | 001 |
| {4-6} | 0 | 0 | (1) | 0 | 1 | 1 | 100 | 001 | 011 | 011 |
| {4-7} | 0 | 0 | (1) | 1 | 1 | 1 | 101 | 001 | 011 | 111 |
| {4-8} | 0 | 0 | (1) | 0 | 0 | 0 | 100 | 000 | 010 | 000 |
| {5-2} | 0 | (1) | 0 | 1 | 1 | 0 | 001 | 011 | 100 | 110 |
| {5-5} | 0 | (1) | 0 | 0 | 1 | 0 | 000 | 011 | 100 | 010 |
| {5-7} | 0 | (1) | 0 | 1 | 1 | 1 | 001 | 011 | 101 | 111 |
| {5-8} | 0 | (1) | 0 | 0 | 0 | 0 | 000 | 010 | 100 | 000 |
| {6-5} | (0) | 1 | 1 | 0 | 1 | 0 | 100 | 011 | 110 | 010 |
| {6-6} | (0) | 1 | 1 | 0 | 1 | 1 | 100 | 011 | 111 | 011 |
| {6-7} | (0) | 1 | 1 | 1 | 1 | 1 | 101 | 011 | 111 | 111 |
| {6-8} | (0) | 1 | 1 | 0 | 0 | 0 | 100 | 010 | 110 | 000 |

TABLE 2

Unit 16-Vertex Body Dividing Method

| Region No. | $a_x \cdot x_{h1}$ | $a_x \cdot y_{h1}$ | $a_x \cdot z_{h1}$ | $t_x \cdot x_{h1}$ |
|---|---|---|---|---|
| {1-1} | $X'(x_{h+1}, y_{h+1}, z_{h+1}, t_{h+1})$ − $X'(x_{h+1}, y_{h+1}, z_{h+1}, t_h)$ | $X'(x_{h+1}, y_{h+1}, z_{h+1}, t_{h+1})$ − $X'(x_{h+1}, y_{h+1}, z_{h+1}, t_h)$ | $X'(x_{h+1}, y_{h+1}, z_{h+1}, t_{h+1})$ − $X'(x_{h+1}, y_{h+1}, z_{h+1}, t_h)$ | $X'(x_{h+1}, y_{h+1}, z_{h+1}, t_{h+1})$ − $X'(x_{h+1}, y_{h+1}, z_{h+1}, t_h)$ |
| {1-3} | same as {1-1} | same as {1-1} | $X'(x_{h+1}, y_{h+1}, z_{h+1}, t_{h+1})$ − $X'(x_{h+1}, y_{h+1}, z_{h+1}, t_h)$ | $X'(x_{h+1}, y_{h+1}, z_{h+1}, t_{h+1})$ − $X'(x_{h+1}, y_{h+1}, z_{h+1}, t_h)$ |
| {1-7} | same as {1-1} | $X'(x_{h+1}, y_{h+1}, z_{h+1}, t_{h+1})$ − $X'(x_{h+1}, y_{h+1}, z_{h+1}, t_h)$ | same as {1-3} | $X'(x_{h+1}, y_{h+1}, z_{h+1}, t_{h+1})$ − $X'(x_{h+1}, y_{h+1}, z_{h+1}, t_h)$ |
| {1-8} | $X'(x_{h+1}, y_{h+1}, z_{h+1}, t_{h+1})$ − $X'(x_{h+1}, y_{h+1}, z_{h+1}, t_h)$ | same as {1-1} | same as {1-1} | $X'(x_{h+1}, y_{h+1}, z_{h+1}, t_{h+1})$ − $X'(x_{h+1}, y_{h+1}, z_{h+1}, t_h)$ |
| {2-1} | same as {1-1} | $X'(x_{h+1}, y_{h+1}, z_{h+1}, t_{h+1})$ − $X'(x_{h+1}, y_{h+1}, z_{h+1}, t_h)$ | $X'(x_{h+1}, y_{h+1}, z_{h+1}, t_{h+1})$ − $X'(x_{h+1}, y_{h+1}, z_{h+1}, t_h)$ | same as {1-1} |
| {2-2} | same as {1-1} | $X'(x_{h+1}, y_{h+1}, z_{h+1}, t_{h+1})$ − $X'(x_{h+1}, y_{h+1}, z_{h+1}, t_h)$ | same as {2-1} | $X'(x_{h+1}, y_{h+1}, z_{h+1}, t_{h+1})$ − $X'(x_{h+1}, y_{h+1}, z_{h+1}, t_h)$ |
| {2-7} | same as {1-1} | same as {2-2} | $X'(x_{h+1}, y_{h+1}, z_{h+1}, t_{h+1})$ − $X'(x_{h+1}, y_{h+1}, z_{h+1}, t_h)$ | same as {1-7} |
| {2-8} | same as {1-8} | same as {2-1} | same as {2-1} | same as {1-8} |
| {3-3} | $X'(x_{h+1}, y_{h+1}, z_{h+1}, t_{h+1})$ − $X'(x_{h+1}, y_{h+1}, z_{h+1}, t_h)$ | same as {1-1} | $X'(x_{h+1}, y_{h+1}, z_{h+1}, t_{h+1})$ − $X'(x_{h+1}, y_{h+1}, z_{h+1}, t_h)$ | same as {1-3} |
| {3-4} | same as {1-1} | same as {3-3} | $X'(x_{h+1}, y_{h+1}, z_{h+1}, t_{h+1})$ − $X'(x_{h+1}, y_{h+1}, z_{h+1}, t_h)$ | $X'(x_{h+1}, y_{h+1}, z_{h+1}, t_{h+1})$ − $X'(x_{h+1}, y_{h+1}, z_{h+1}, t_h)$ |
| {3-7} | same as {3-3} | same as {1-7} | same as {3-3} | same as {1-7} |
| {3-8} | same as {3-4} | same as {1-1} | $X'(x_{h+1}, y_{h+1}, z_{h+1}, t_{h+1})$ − $X'(x_{h+1}, y_{h+1}, z_{h+1}, t_h)$ | same as {1-8} |
| {4-4} | $X'(x_{h+1}, y_{h+1}, z_{h+1}, t_{h+1})$ − $X'(x_{h+1}, y_{h+1}, z_{h+1}, t_h)$ | $X'(x_{h+1}, y_{h+1}, z_{h+1}, t_{h+1})$ − $X'(x_{h+1}, y_{h+1}, z_{h+1}, t_h)$ | same as {3-3} | same as {3-7} |
| {4-6} | same as {4-4} | $X'(x_{h+1}, y_{h+1}, z_{h+1}, t_{h+1})$ − $X'(x_{h+1}, y_{h+1}, z_{h+1}, t_h)$ | same as {3-3} | $X'(x_{h+1}, y_{h+1}, z_{h+1}, t_{h+1})$ − $X'(x_{h+1}, y_{h+1}, z_{h+1}, t_h)$ |
| {4-7} | $X'(x_{h+1}, y_{h+1}, z_{h+1}, t_{h+1})$ − $X'(x_{h+1}, y_{h+1}, z_{h+1}, t_h)$ | same as {4-6} | same as {3-3} | same as {1-7} |
| {4-8} | same as {4-4} | same as {4-4} | same as {3-8} | same as {1-8} |
| {5-2} | $X'(x_{h+1}, y_{h+1}, z_{h+1}, t_{h+1})$ − $X'(x_{h+1}, y_{h+1}, z_{h+1}, t_h)$ | $X'(x_{h+1}, y_{h+1}, z_{h+1}, t_{h+1})$ − $X'(x_{h+1}, y_{h+1}, z_{h+1}, t_h)$ | same as {2-1} | same as {2-2} |
| {5-5} | $X'(x_{h+1}, y_{h+1}, z_{h+1}, t_{h+1})$ − $X'(x_{h+1}, y_{h+1}, z_{h+1}, t_h)$ | same as {5-2} | same as {2-1} | $X'(x_{h+1}, y_{h+1}, z_{h+1}, t_{h+1})$ − $X'(x_{h+1}, y_{h+1}, z_{h+1}, t_h)$ |
| {5-7} | same as {5-2} | same as {5-2} | same as {2-7} | same as {1-7} |
| {5-8} | same as {5-5} | $X'(x_{h+1}, y_{h+1}, z_{h+1}, t_{h+1})$ − $X'(x_{h+1}, y_{h+1}, z_{h+1}, t_h)$ | same as {2-1} | same as {1-8} |
| {6-5} | same as {4-4} | same as {5-2} | $X'(x_{h+1}, y_{h+1}, z_{h+1}, t_{h+1})$ − $X'(x_{h+1}, y_{h+1}, z_{h+1}, t_h)$ | same as {5-5} |
| {6-6} | same as {4-4} | same as {5-2} | $X'(x_{h+1}, y_{h+1}, z_{h+1}, t_{h+1})$ − $X'(x_{h+1}, y_{h+1}, z_{h+1}, t_h)$ | same as {4-6} |
| {6-7} | same as {4-7} | same as {5-2} | same as {6-6} | same as {1-7} |
| {6-8} | same as {4-7} | same as {5-8} | same as {6-5} | same as {1-8} |

Note:
$x_{h1}, y_{h1}, z_{h1}, t_{h1}$: Unit length of the coject regions to be interpolated The illustration of FIG. 1 is not exact because a four dimensional object is depicted in the form of a three dimensional object. The divisions of regions (2}, {3}, {4}, and {5} are omitted, for simplicity of illustration; however, the illustration suffices for understanding that a 16-vertex body is divided into 24 number of 5-vertex bodies.

In FIG. 1, the 16-vertex body is expressed using two cubes, however, the interpolated region may be a 16-vertex body of which the sides are different, or modified 16-vertex body in the case of the inputs expressed in the polar coordinates.

An apparatus for executing the color signals transforming method has four input signals colors being each divided into the lower bits and the higher bits, basic data color correction memory means (1 in FIGS. 2 to 8), when receiving an address signal as the combination of the higher bits, for producing basic data, interpolation data generating means (5, 6, and 7 in FIG. 2; 5, 6, and 8 in FIG. 3; 2, 4, and 5 in FIG. 4; 2, 4, and 8 in FIG. 5; 6, and 8 through 11 in FIG. 6; 2, and 8 through 12 in FIG. 7) for generating the combinations of interpolation data in accordance with the combination of the higher bits and the combination of the lower bits, and adder means (1 in FIGS. 2 through 8) for adding the output signal of the color correction memory means and the output signal of the interpolation data generating means, thereby to produce an output signal, the improvement in which the interpolation data generating means includes means (5 and 7 in FIG. 2; 5 and 8 in FIG. 3; 4 and 7 in FIG. 4; 4 and 8 in FIG. 5; 8 through 11 in FIG. 6; 8 through 12 in FIG. 7; 4 and 7 in FIG. 8) for dividing a 16-vertex body of each object to be interpolated into twenty-four 5-vertex bodies each passing through one of sixteen lattice points constituting the 16-vertex body, and for assigning the different combinations of interpolation data to the 5-vertex bodies in one-to-one correspondence manner.

In another mode of the present invention, the interpolation data generating means includes interpolation region select memory means (2 in FIG. 2 and 7 in FIG. 4) for outputting a plurality of interpolation region select signals that are fit to the commonness of the interpolation sensitivity signals, with the combination of the lower bits as an address signal, to specify to which of the twenty-four 5-vertex bodies contains each the input signal belongs.

The interpolation region select signals correspond to $d_x(x_1, y_1, z_1, t_1)$, $d_y(x_1, y_1, z_1, t_1)$, $d_z(x_1, y_1, z_1, t_1)$, and $d_t(x_1, y_1, z_1, t_1)$ in the equation (2), and to the signals: $[z_1 > x_1, x_1 > = y_1, x_1 > t_1]$, $[x_1 > = y_1, y_1 > z_1, y_1 > t_1]$, $[y_1 > z_1, z_1 > x_1, z_1 > t_1]$, and $[y_1 > z_1, z_1 > x_1, z_1 > t_1]$.

As seen from Table 1, the interpolation sensitivity signals $a_x$, $a_y$, $a_z$, and $a_t$ of 24 number of 5-vertex bodies are different from one another, but when observing individually the elements of the signals $a_x$, $a_y$, $a_z$, and $a_t$, the elements have something in common with one another. The interpolation region select signals are set so as to be fit to the commonness.

In yet another mode of the invention, the interpolation data generating means includes a plurality of comparators (8 in FIGS. 3, 5, and 7) for comparing the lower bits of the four input signals or some shifted lower bits of the four input signals, to specify which of the twenty-four 5-vertex bodies contains each the input signal, and means for producing the combinations of the output signals of the comparators in the form of a plurality of interpolation region select signals that are fit to the commonness of the interpolation sensitivity signals.

The color signal transforming apparatus as just mentioned calculates interpolation region select signals by using the comparators, for example, instead of causing the memory to produce those signals. Example is shown in FIG. 1. The dividing method of FIG. 1 and Table 1 requires six comparators corresponding to $x_1 > = y_1$, $y_1 > z_1$, $z_1 > x_1$, $x_1 > t_1$, $y_1 > t_1$, and $z_1 > t_1$.

Where the numbers of the lower bits of the four input signals are different, these are correspondingly ordered in their places by shift registers before input to the comparators.

In a still another mode of the invention, the interpolation data generating means includes interpolation sensitivity output memory means (5 in FIGS. 2 and 3) for producing a plurality of interpolation sensitivity signals in response to address signals consisting of the combination of the higher bits of the four input color signals and some of the interpolation region select signals, and a plurality of interpolation data output means (6 in FIGS. 2 and 3) for producing interpolation data by multiplying one of the output signals of the interpolation sensitivity output memory means by the lower bit of one of the four input color signals.

The plurality of interpolation sensitivity signals correspond to $a_x(x_h, y_h, z_h, t_h, d_x(x_1, y_1, z_1, t_1))$, $a_y(x_h, y_h, z_h, t_h, d_y(x_1, y_1, z_1, t_1))$, $a_z(x_h, y_h, z_h, t_h, d_z(x_1, y_1, z_1, t_1))$, and $a_t(x_h, y_h, z_h, t_h, d_t(x_1, y_1, z_1, t_1))$ in the equation (2).

In a further mode of the invention, the interpolation data generating means includes interpolation sensitivity select output memory means (4 in FIGS. 4 and 5}for producing a plurality of interpolation sensitivity signals in response to address signals consisting of the combination of the higher bits of the four input color signals and some of the interpolation region select signals, and a plurality of interpolation data output memory means (2 in FIGS. 4 and 5) for producing interpolation data in response to an address signal including one of the output signals of the interpolation sensitivity select output memory means and the lower bit of one of the four input color signals.

The plurality of interpolation sensitivity select signals correspond to $b_x(x_h, y_h, z_h, t_h, d_x((x_1, y_1, z_1, t_1))$, $b_y(x_h, y_h, z_h, t_h, d_y(x_1, y_1, z_1, t_1))$, $b_z(x_h, y_h, z_h, t_h, d_z(x_1, y_1, z_1, t_1))$, and $b_t(x_h, y_h, z_h, t_h, d_t(x_1, y_1, z_1, t_1))$, $t_1)$ in the equation (2).

The interpolation data signals correspond to $c(b_x(x_h, y_h, z_h, t_h, d_x((x_1, y_1, z_1, t_1)), x_1)$, $c(b_y(x_h, y_h, z_h, t_h, d_y(x_1, y_1, z_1, t_1)), y_1)$, $c(b_z(x_h, y_h, z_h , t_h, d_z(x_1, y_1, z_1, t_1)), z_1)$, and $c(b_t(x_h, y_h, z_h, t_h, d_t(x_1, y_1, z_1, t_1)), t_1)$ in the equation (2).

In this case, the memory is used in place of the multiplying operation. Accordingly, there is no need to use the interpolation intensities per se. In place of them, interpolation sensitivity select output signals are used to specify the memory addresses where the corresponding interpolation intensities are stored.

In a further mode of the invention, the interpolation data generating means includes interpolation sensitivity output means containing a memory portion (9 in FIG. 6) for producing difference data corresponding to fifteen lattice points as the remaining lattice points when one of the sixteen lattice points of each 16-vertex body as the interpolated region is a reference point, in response to an address signal as the combination of the higher bits of the four input color signals, a plurality of subtractor portions (10 in FIG. 6) for calculating the difference between the difference data, and a portion (11 in FIG. 6) for selecting a plurality of proper interpolation sensitivity output signals from among the difference data or the subtraction results by using some of the interpolation region select signals; and a plurality of interpolation data output means (6 in FIG. 6) for outputting interpolation data by multiplying one of the output signals of the interpolation sensitivity output means by the lower bit of one of the four input signals.

The difference data corresponding to fifteen lattice points as the remaining lattice points when one of the lattice points of each 16-vertex body as the interpolated region is a reference point corresponds to $e_x(x_h, y_h, z_h, t_h)$, $e_y(x_h, y_h, z_h, t_h)$, $e_z(x_h, y_h, z_h, t_h)$, and $e_t(x_h, y_h, z_h, t_h)$ in the equation (2).

The interpolation sensitivity signals correspond to $a_x(e_x(x_h, y_h, z_h, t_h), d_x(x_1, y_1, z_1, t_1))$, $a_y(e_y(x_h, y_h, z_h, t_h), d_y(x_1, y_1, z_1, t_1))$, $a_z(e_z(x_h, y_h, z_y, t_h), d_z(x_1, y_1, z_1, t_1))$, and $a_t(e_t(x_h, y_h, z_h, t_h), d_t(x_1, y_1, z_1, t_1))$.

In an additional mode of the invention, the interpolation data generating means includes interpolation sensitivity select output means containing a memory portion (9 in FIG. 7) for producing difference data corresponding to fifteen lattice points as the remaining lattice points when one of the sixteen lattice points of each 16-vertex body as the interpolated region is a reference point, in response to an address signal as the combination of the higher bits of the four input color signals, a plurality of subtractor portions (10 in FIG. 7) for calculating the difference between the difference data, a portion for selecting a plurality of proper interpolation sensitivity output signals from among the difference data or the subtraction results by using some of the interpolation region select signals, and portions (11 in FIG. 7) for transforming the plurality of selected interpolation sensitivity output signals into a plurality of interpolation sensitivity select signals; and a plurality of interpolation data output memory means (2 in FIG. 7) for outputting interpolation data in response to an address signal containing one of the output signals of the interpolation sensitivity select output means and the lower bit of one of the four input signals.

The interpolation sensitivity select signals correspond to $b_x(e_x(x_h, y_h, z_h, t_h), d_x(x_1, y_1, z_1, t_1))$, $b_y(e_y(x_h, y_h, z_h, t_h), d_y(x_1, y_1, z_1, t_1)$, $b_z(e_z(x_h, y_h, z_h, t_h), d_z(x_1, y_1, z_1, t_1))$, and $b_t(e_t(x_h, y_h, z_h, t_h), d_t(x_1, y_1, z_1, t_1))$ in the equation (2). The interpolation data correspond to $c(b_x(e_x(x_h, y_h, z_h, t_h), d_x(x_1, y_1, z_1, t_1))x_1$, $c(b_y(e_y(x_h, y_h, z_h, t_h), d_y(x_1, y_1, z_1, t_1)), y_1)$, $c (b_z(e_z(x_h, y_h, z_h, t_h), d_z(x_1, y_1, z_1, t_1)), z_1)$, and $c (b_t (e_t(x_h, y_h, z_h, t_h), d_t(x_1, y_1, z_1, t_1)), t_1)$ in the equation (2).

Also in this case, the memory is used in place of the multiplying operation. Accordingly, there is no need of using the interpolation intensities per se. The interpolation sensitivity signals are transformed into interpolation sensitivity select output signals, which are for specifying the memory addresses where the corresponding interpolation intensities are stored.

A color signal transforming apparatus comprising: a start address/lower bit generating memory (13 in FIG. 18), when receiving an address signal containing two, or first and second input signals, of four input signals representative of a first colorimetric coordinate, for producing a start address previously set in consideration of a color reproduction range of an output device and the modified lower bits of the two input signals; maximum/minimum generating means (14 in FIG. 8), when receiving an address signal containing the first and second input signals, for generating the maximum and minimum values of a third input signal of the four input signals, in consideration of the color reproduction range of the output device; calculating means (16 and 17 in FIG. 8) for modifying the third input signal using the maximum and minimum values output from the maximum/minimum generating means; an address adder (15 in FIG. 8) for adding the start address output from the start address/lower bit generating memory and the higher bit of a fixed number of the modified result from the calculating means; a basic data color correction memory (1 in FIG. 8) for producing basic data signals representative of colors of a second calorimetric coordinate in response to an address signal as the output signal of the address adder and a fourth input signal of the four input signals; interpolation data generating means (7, 5, and 6 in FIG. 8) for generating a set of interpolation data on the basis of the combination of the higher bits output from the address adder and the combination of the modified lower bits of the input signals; adder means (3 in FIG. 8) for producing output signals representative of colors of the second calorimetric coordinate by adding the output signal of the basic data color correction memory and the output signal of the interpolation data generating means; and the interpolation data generating means (7 and 5 in FIG. 8) including means for dividing a 16-vertex body of each object to be interpolated into twenty-four 5-vertex bodies each passing through one of sixteen lattice points constituting the 16-vertex body, and for assigning the different combinations of interpolation data to the 5-vertex bodies in one-to-one correspondence manner.

In the present invention, four input signals representative of colors are each divided into the higher bits and the lower bits. The color correction memory for basic data is addressed with the combination of the higher bits, so that it produces basic data corresponding to $X'(x_h, y_h, z_y, t_h)$ in the equation (2).

The combination of the lower bits is input as an address signal to the memory means for interpolation region select or is input to the interpolation region select signal output means including comparators, for example, which in turn produces a plurality of interpolation region select signals corresponding to $d_x(x_1, y_1, z_1, t_1)$, $d_y(x_1, y_1, z_1, t_1)$, and $d_z((x_1, y_1, z_1, t_1)$ in the equation (2).

The combination of the higher bits of the input signals and some of the interpolation region select signals are input to the interpolation sensitivity output memory means or the interpolation sensitivity output means, so that a plurality of interpolation sensitivity signals corresponding to $a_x(x_h, y_h, z_h, t_h, d_x((x_1, y_1, z_1, t_1))$, $a_y(x_h, y_h, z_h, t_h, d_y(x_1, y_1, z_1, t_1))$, $a_z(x_h, Y_h, z_h, t_h, d_z(x_1, y_1, z_1, t_1))$, $a_t(x_h, y_h, z_h, t_h, d_t(x_1, y_1, z_1, t_1))$, $a_x(e_x(x_h, y_h, z_h, t_h, d_x((x_1, y_1, z_1, t_1))$, $a_y (e_y(x_h, y_h, z_h, t_h, d_y(x_1, y_1, z_1, t_1))$, $a_z(e_z(x_h, y_h, z_h, t_h, d_z(x_1, y_1, z_1, t_1))$, and $a_t (e_t(x_h, y_h, z_h, t_h, d_t(x_1, y_1, z_1, t_1))$ in the equation (2).

The combination of the higher bits of the input signals and some of the interpolation region select signals are input to the interpolation sensitivity select output memory means or the interpolation sensitivity select output means, so that a plurality of interpolation sensitivity select signals corresponding to $b_x(x_h, y_h, z_h, t_h, d_x((x_1, y_1, z_1, t_1))$, $b_y(x_h, y_h, z_h, t_h, d_y(x_1, y_1, z_1, t_1))$, $b_z(x_h, y_h, z_h, t_h, d_z(x_1, y_1, z_1, t_1))$, $b_t(x_h, y_h, z_h, t_h, d_t(x_1, y_1, z_1, t_1))$, $b_x(e_x(x_h, y_h, z_h, t_h, d_x((x_1, y_1, z_1, t_1))$, $b_y(e_y(x_h, y_h, z_h, t_h, d_y(x_1, y_1, z_1, t_1))$, $b_z(e_z(x_h, y_h, z_h, t_h, d_z(x_1, y_1, z_1, $t_1$)), and $b_t(e_t(x_h, y_h, z_h, t_h, d_t(x_1, y_1, z_1, t_1))$ in the equation (2).

Each of the plurality of interpolation sensitivity signals is multiplied by one of the lower bits of the input signals, thereby producing plural interpolation data.

Or the interpolation sensitivity select signals and the lower bits of the input signal are input as address signals to the plurality of interpolation data output memory means, so that plural interpolation data corresponding to $c(b_x(e_x(x_h, y_h, z_h, t_h, d_x((x_1, y_1, z_1, t_1), x_1), c(b_y(e_y(x_h, y_h, z_h, t_h, d_y(x_1, y_1, z_1, t_1)), y_1), c(b_z(e_z(x_h, y_h, z_h, t_h, d_z(x_1, y_1, z_1, t_1)), z_1)$, and $c(b_t(e_t(x_h, y_h, z_h, t_h, d_t(x_1, y_1, z_1, t_1), t_1)$ in the equation (2).

Finally, the basic data is added to the plural interpolation data, so that an interpolated value corresponding to $X'(x, y, z, t)$ is output.

In addition to the arrangement of the color signal transforming apparatus including the interpolation data generating means, the color signal transforming apparatus of the invention may take the arrangement including the start address/lower bit generating memory, the address adder, maximum/minimum generating memory, and calculators. The latter arrangement of the apparatus has the advantageous effects comparable with those of the former arrangement. Further, the start address can be previously set so as to efficiently use the color correction memories while considering the color reproduction ranges (of the colors in the calorimetric coordinate) of the output device. The input signals of colors out of the color reproduction range of the output device, when received, can be transformed into the signals of colors within the color reproduction range. With this feature, the memory capacity of each color correction memory can be further saved, and the resultant color signal transforming apparatus is operable at high speed.

BRIEF DESCRIPTION OF THE DRAWINGS

In the accompanying drawings, which are incorporated in and constitute a part of this specification, illustrate embodiments of the invention and, together with the description, serve to explain the objects, advantages and principles of the invention. In the drawings, FIG. 1a is an explanatory diagram showing a method for dividing a unit 16-vertex body according to the present invention, the figure cooperating with FIGS. 1b and 1c to form a single drawing;

DESCRIPTION OF THE PREFERRED EMBODIMENTS

The preferred embodiments of the invention will be described with reference to FIG. 3 and the subsequent figures. In those figures, for ease of explanation, the K control signal consists of (n'+8-n) bit, and input color signals L*, a*, and b* consist of 7 bits, 8 bits, and 8 bits, respectively. The lower bits of each input color signal are (8-n) bits. Output color signals Y %, M %, and C % (K %) are each expressed by 8 bits. It is evident, however, that the kinds of the input and output color signals and the numbers of bits forming those color signals are not limited to those illustrated.

A circuit arrangement for only one kind of output signal is illustrated, for simplicity. If required, the invention is applicable for plural kinds of output signals.

Where the circuit is arranged so as to handle plural kinds of output signals, the hardware component that can be used common to the plural kinds of output signals, such as interpolation region select signal output memory means or the interpolation region select signal output means, may be used as a common hardware component as shown. Alternatively, those components may be constructed independently where it is desired to provide the signal processing routes respectively for those different kinds of output signals.

1ST EMBODIMENT

Figure 1B:
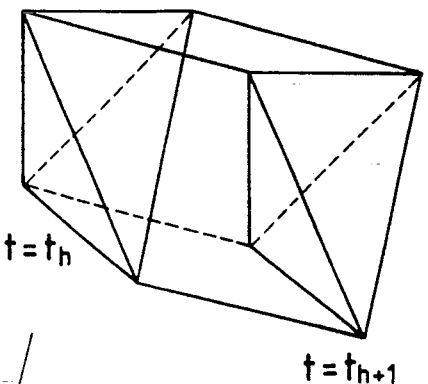
FIG. 1b is an explanatory diagram showing the method for dividing a unit 16-vertex body according to the present invention.
Figure 1B:
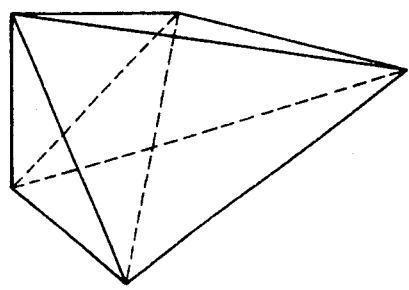
Figure 1B:
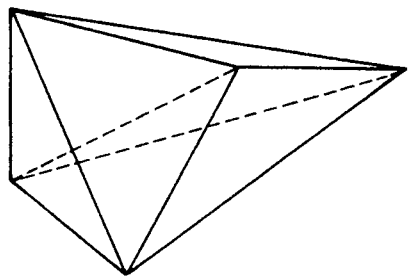
Figure 1B:
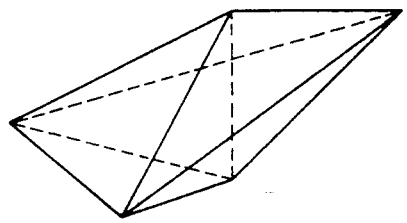
Figure 1B:
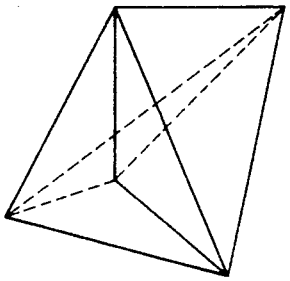
Figure 1C:
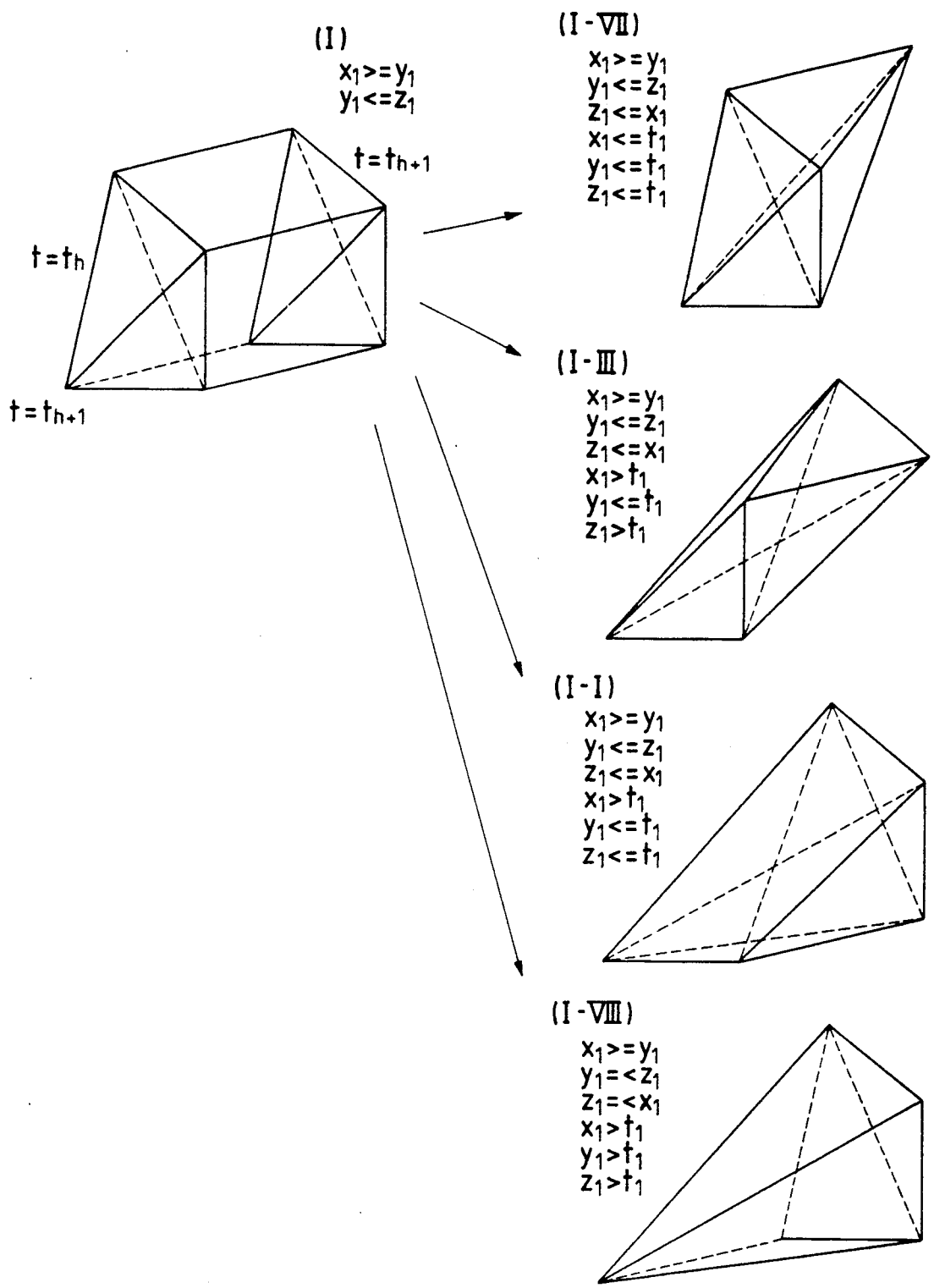
FIG. 1c is an explanatory diagram showing the method for dividing a unit 16-vertex body according to the present invention.
Figure 2:
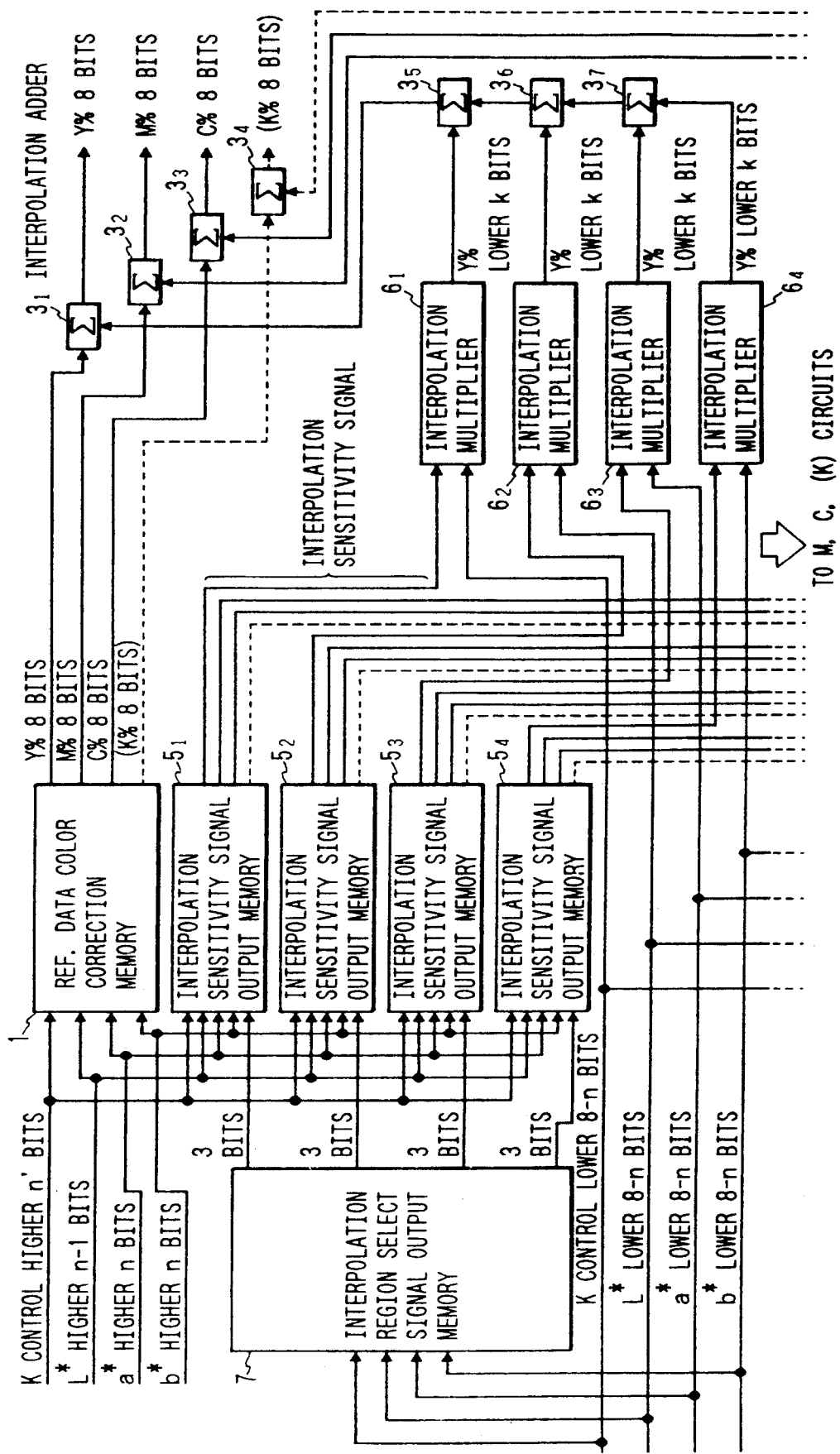
FIG. 2 is a Block diagram showing a color signal transforming circuit according to a first embodiment of the present invention.

The arrangement of a first embodiment of the invention is illustrated in FIG. 2.

The first embodiment is made up of a color correction memory 1 for basic data, an interpolation region select signal output memory 7, interpolation sensitivity signal output memories $5_1$ to $5_4$, interpolation multipliers $6_1$ to $6_4$, and interpolation adders $3_1$ to $3_4$.

The basic data color correction memory 1 is a look-up table memory which receives an address signal consisting of the higher bits of the K control signal and the input color signals L*, a*, and b*, and produces a correction reference value corresponding to $X'(x_h, y_h, z_h)$ in the equation (2).

The interpolation region select signal output memory 7 is also a look-up table memory which receives an address signal consisting of the lower bits of the K control signal and the input color signals L*, a*, and b*, and produces interpolation region select signals correspond to $d_x(x_1, y_1, z_1, t_1)$, $d_y(x_1, y_1, z_1, t_1)$, and $d_z((x_1, y_1, z_1, t_1)$ in the equation (2). In FIG. 2, the output consists of four ways each of 3 bits, with relation to the dividing method shown in FIG. 1 and Table 1.

In FIG. 2, the input signals have the same number of the lower bits, but these signals may have different numbers of the lower bits.

The interpolation sensitivity signal output memories $5$ to $5_4$ are look-up table memories each of which receives an address signal containing the higher bits of the K control signal and the input color signals $L^*$, $a^*$, and $b^*$ and the interpolation region select signal, and produces a plurality of interpolation sensitivity signals corresponding to $a_x(x_h, y_h, z_h, t_h, d_x(x_1, y_1, z_1, t_1))$, $a_y(x_h, y_h, z_h, t_h, d_z(x_1, y_1, z_1, t_1))$, and $a_z(x_h, y_h, z_h, t_h, d_z(x_1, y_1, z_1, t_1))$ in the equation (2). Their bit width is determined depending on the required accuracies for the multipliers and adders that are located in the subsequent stages.

The interpolation multipliers $6_1$ to $6_4$ multiply the interpolation sensitivity signals by the lower bits of the K control signal and the input color signals $L^*$, $a^*$, and $b^*$, respectively, thereby producing plural interpolation data corresponding to $a_x(x_h, y_h, z_h, t_h, d_x(x_1, y_1, z_1, t_1))$, $a_y(x_h, y_h, z_h, t_h, d_y(x_1, y_1, z_1, t_1))$, and $a_z(x_h, y_h, z_h, t_h, d_z(x_1, y_1, z_1, t_1))$, and $a_t(x_h, y_h, z_h, t_h, d_t(x_1, y_1, z_1, t_1))$ in the equation (2). Their bit width is determined depending on the required accuracies for the multipliers and adders that are located in the subsequent stages.

Finally, the interpolation adders 3 add the interpolation reference values and the interpolation data, respectively, thereby producing the interpolated values.

The color signal transforming apparatus according to the first embodiment of the present invention includes the interpolation region select signal output memory 7 and the interpolation sensitivity signal output memories $5_1$ to $5_4$ so that a 16-vertex body of each object to be interpolated is divided into twenty-four 5-vertex bodies each passing through one of sixteen lattice points constituting the 16-vertex body, and for assigning the different combinations of interpolation data to the 5-vertex bodies in one-to-one correspondence manner. With provision of those memories, there is no need for the complicated address conversion which is required when the reference values are read out of the color correction memory. Accordingly, the first embodiment can realize the color signal transforming apparatus that is simple in construction and operable at high speed. Further, the regular arrangement of data in the color correction memory is not essential in the color signal transforming apparatus of the first embodiment. Therefore, the color signal transforming apparatus accepts use of the technique to remove the memory portion out of the color reproduction range by removing the regularity in the data arrangement as disclosed in Published Unexamined Japanese Patent Application Nos. Hei. 2-73779 and 2-187374. Additionally, the interpolation continuity at the boundary between the adjacent interpolation regions can be secured.

Furthermore, with provision of the interpolation region select signal output memory 7, the interpolation sensitivity signal output memories $5_1$ to $5_4$, the number of required calculations on the output data can be reduced, resulting in realizing the color signal transforming apparatus that is simple in construction and operable at high speed.

2ND EMBODIMENT

Figure 3:
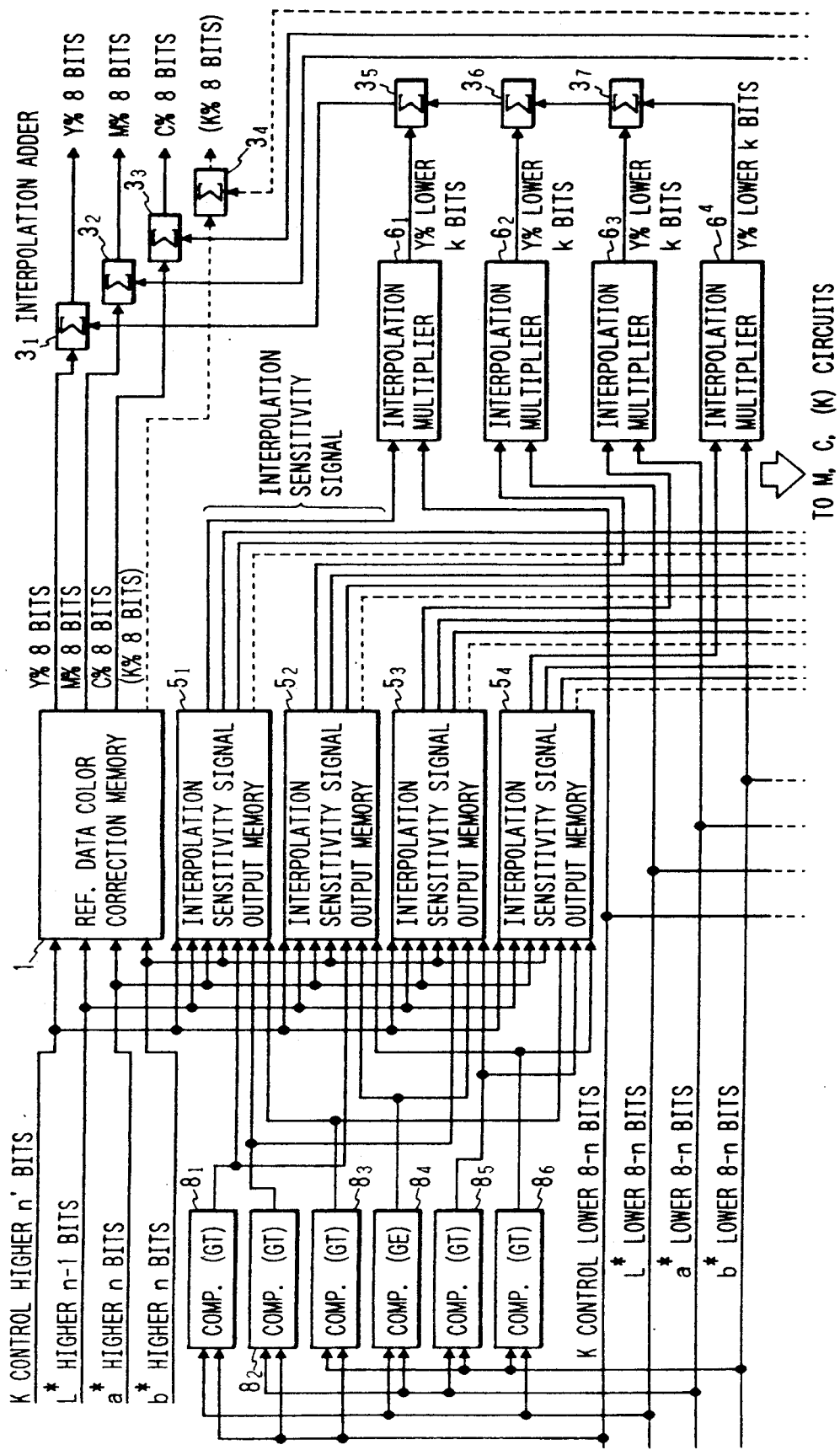
FIG. 3 is a block diagram showing a color signal transforming circuit according to a second embodiment of the present invention.

The arrangement of a second embodiment of the invention is illustrated in FIG. 3.

In the second embodiment, a plurality of comparators $8_1$ to $8_6$ are used in place of the interpolation region select signal output memory 7 that is used in the first embodiment. Those comparators are for comparing the lower bits of the K control signal and the input color signals L., a , and b. The remaining arrangement is substantially the same as that of the first embodiment. The interpolation region select signals are calculated by the comparators, while these signals are produced from the memories. The second embodiment using the comparators is advantageous where the number of the lower bits is increased. In such a case, a large memory must be used for the interpolation region select signal output memory 7 in the first embodiment.

The comparators $8_1$ to $8_6$ are constructed in connection with the dividing method of FIG. 1 and Table 1, and in consideration with the operation at the boundaries. Accordingly, one comparator $8_1$ contains the equal sign, while the remaining ones $8_2$ to $8_3$ do not contain it. The comparators correspond to $x_1 \geq y_1$, $y_1 > z_1$, $z_1 > x_1$, $x_1 > t_1$, $y_1 > t_1$, and $z_1 > t_1$ in Table 1.

In the second embodiment, where the numbers of the lower bits of the input signals are different, these are ordered in their places by shift registers before input to the comparators.

3RD EMBODIMENT

Figure 4:
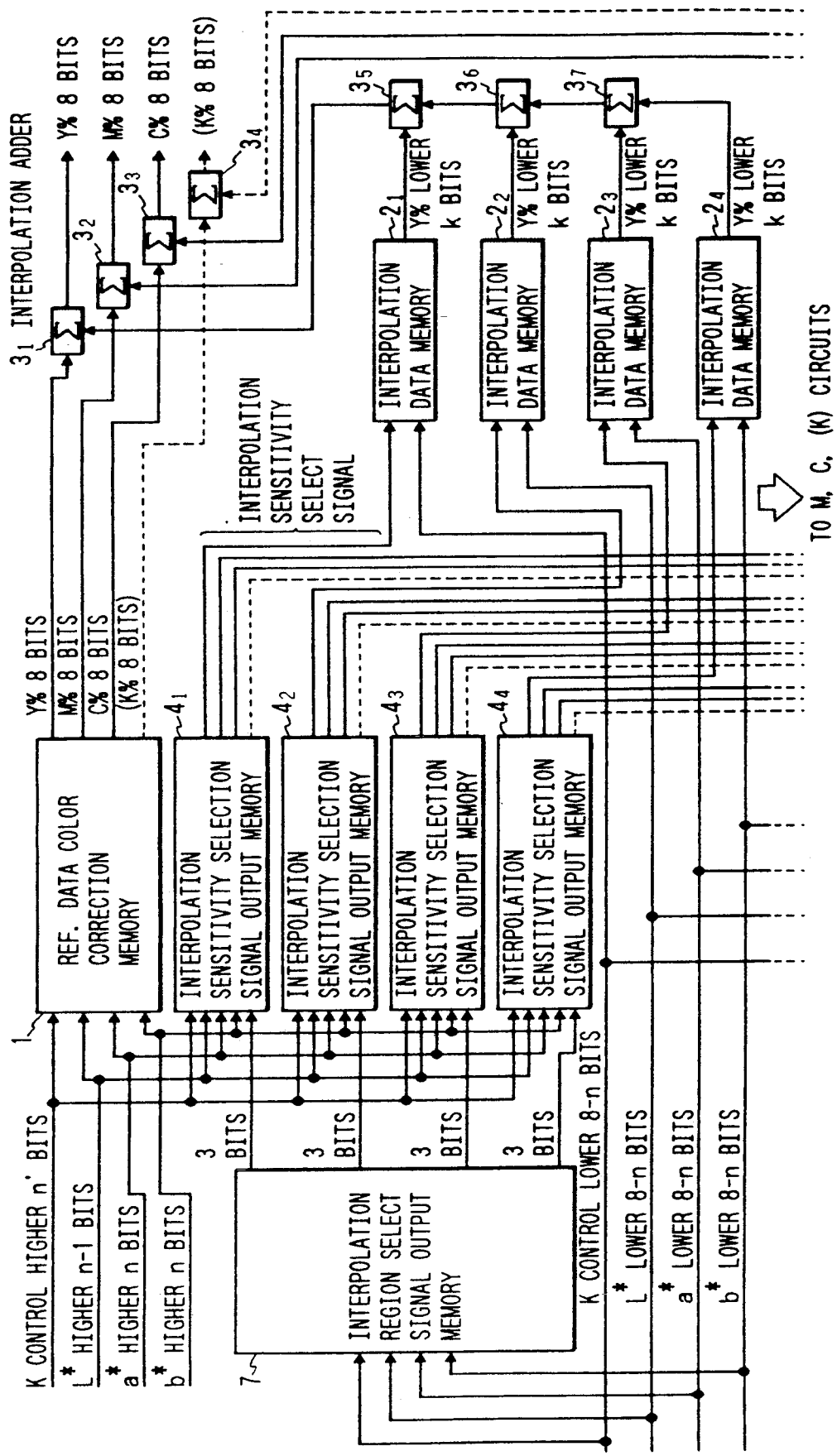
FIG. 4 is a block diagram showing a color signal transforming circuit according to a third embodiment of the present invention.

FIG. 4 is a block diagram showing the arrangement of a third embodiment of the present invention.

In the third embodiment, interpolation sensitivity select signal output memories $4_1$ to $4_4$ and interpolation data memories $2_1$ to $2_4$ are used in place of the interpolation sensitivity signal output memories 5 and the interpolation multipliers 6. The remaining arrangement of the third embodiment is substantially the same as that of the first embodiment. When the number of the higher bits is increased but the number of the lower bits is decreased, the whole circuit scale of the third embodiment is smaller than that of the first embodiment.

The interpolation sensitivity select signal output memories $4_1$ to $4_4$ are look-up table memories. The K control signal and the higher bits of the input signals $L^*$, $a^*$, and $b^*$, and some of the interpolation region select signals form address signals to the interpolation sensitivity select signal output memories $4_1$ to $4_4$. When receiving the address signals, the interpolation sensitivity select signal output memories $4_1$ to $4_4$ produce interpolation sensitivity select signals corresponding to $b_x(e_x(x_h, y_h, z_h, t_h), d_x(x_1, y_1, z_1, t_1))$, $b_y(e_y(x_h, y_h, z_h, t_h), d_y(x_1, y_1, z_1t_1))$, $b_z(e_z(x_h, y_h, z_h, t_h), d_z(x_1, y_1, z_1, t_1))$, and $b_t(e_t(x_h, y_h, z_h, t_h), d_t(x_2, y_1, z_1, t_1))$ in the equation (32). In the instant embodiment, since the look-up table memories are used for the look-up table memories in place of the multipliers. The signals output from the memories are not the interpolation sensitivity signals, but address signals to the memories storing the interpolation data representative of the corresponding interpolation sensitivity signals.

Their bit width depends on what number of different interpolation sensitivity signals are required for the whole color space of the input color signals.

The interpolation data memories $2_1$ to $2_4$ are look-up table memories that are addressed by the output signals of the corresponding interpolation sensitivity select signal output memories $4_1$ to $4_4$, and one of the lower bits of the K control signal and the input color signals $L^*$, $a^*$, and $b^*$. In response to the address signal, the interpolation data memories produce interpolation data corresponding to $c(b_x(e_x(x_h, y_h, z_h, t_h), d_x(x_1, y_1, z_1, t_1))$, $x_1)$, $c(b_y(e_y(x_h, y_h, z_h, t_h), d_y(x_1, y_1, z_1, t_1)), y_1)$, $c(b_z(e_z(x_h, y_h, z_h, t_h), d_z(x_1, y_1, z_1, t_1)), z_1)$, and $c(b_t(e_t(x_h, $y_h$, $z_h$, $t_h$), $d_r(x_1, y_1, z_1, t_1)$), $t_1$) in the equation (2). Their bit width depends on the required accuracy of the adders following the memories.

4TH EMBODIMENT

Figure 5:
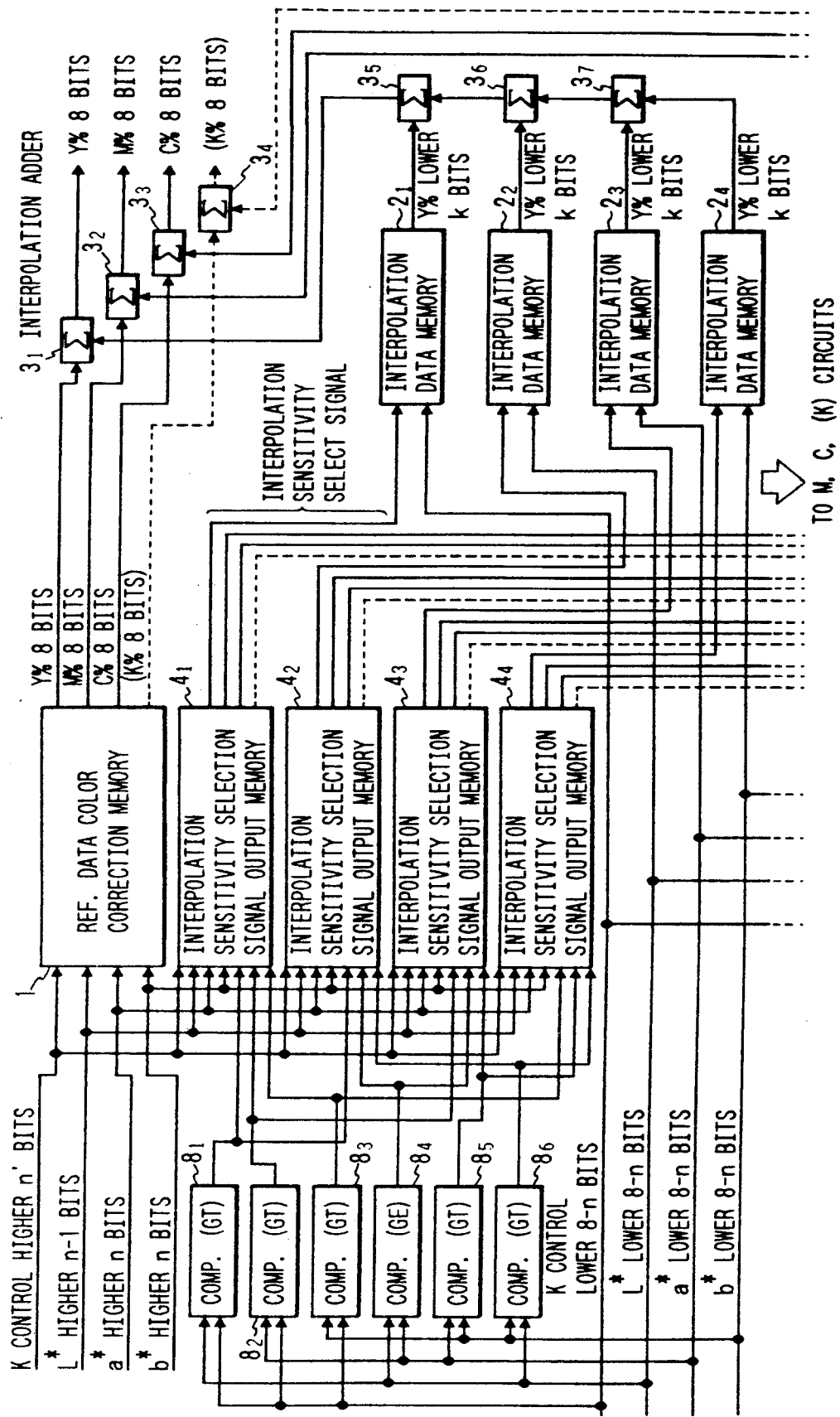
FIG. 5 is a block diagram showing a color signal transforming circuit according to a fourth embodiment of the present invention.

FIG. 5 is a block diagram showing the arrangement of a fourth embodiment of the present invention.

In the fourth embodiment, the interpolation region select signal output memory 7 in the third embodiment is substituted by comparators $8_1$ to $8_6$ which are for comparing the lower bits of the K control signal and the input color signals L*, a*, and b*. For the description on the comparators 8, reference is made to the corresponding portion in the second embodiment.

5TH EMBODIMENT

Figure 6A:
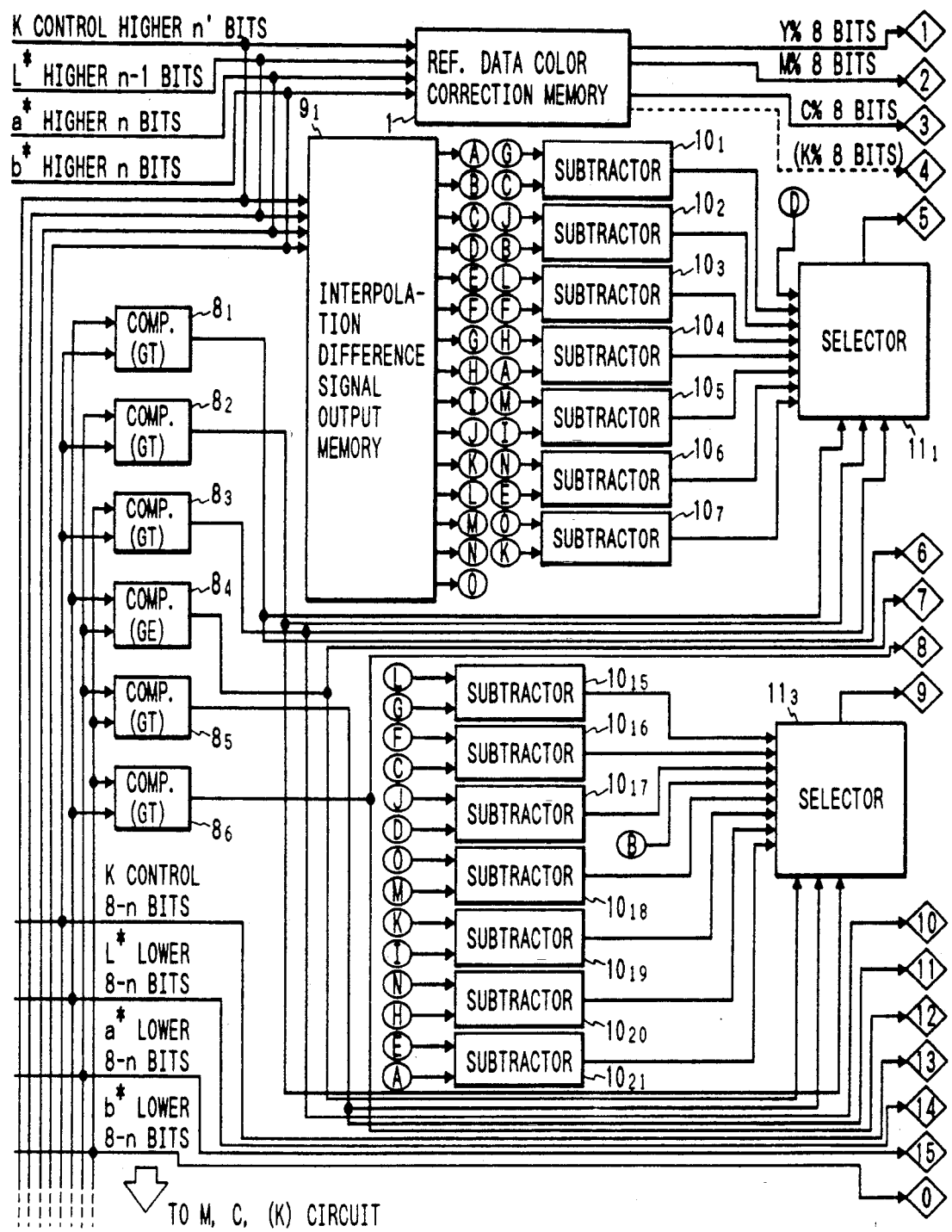
FIG. 6a is a block diagram showing a color signal transforming circuit according to a fifth embodiment of the present invention, the figure cooperating with FIG. 6b to form a single drawing.
Figure 6B:
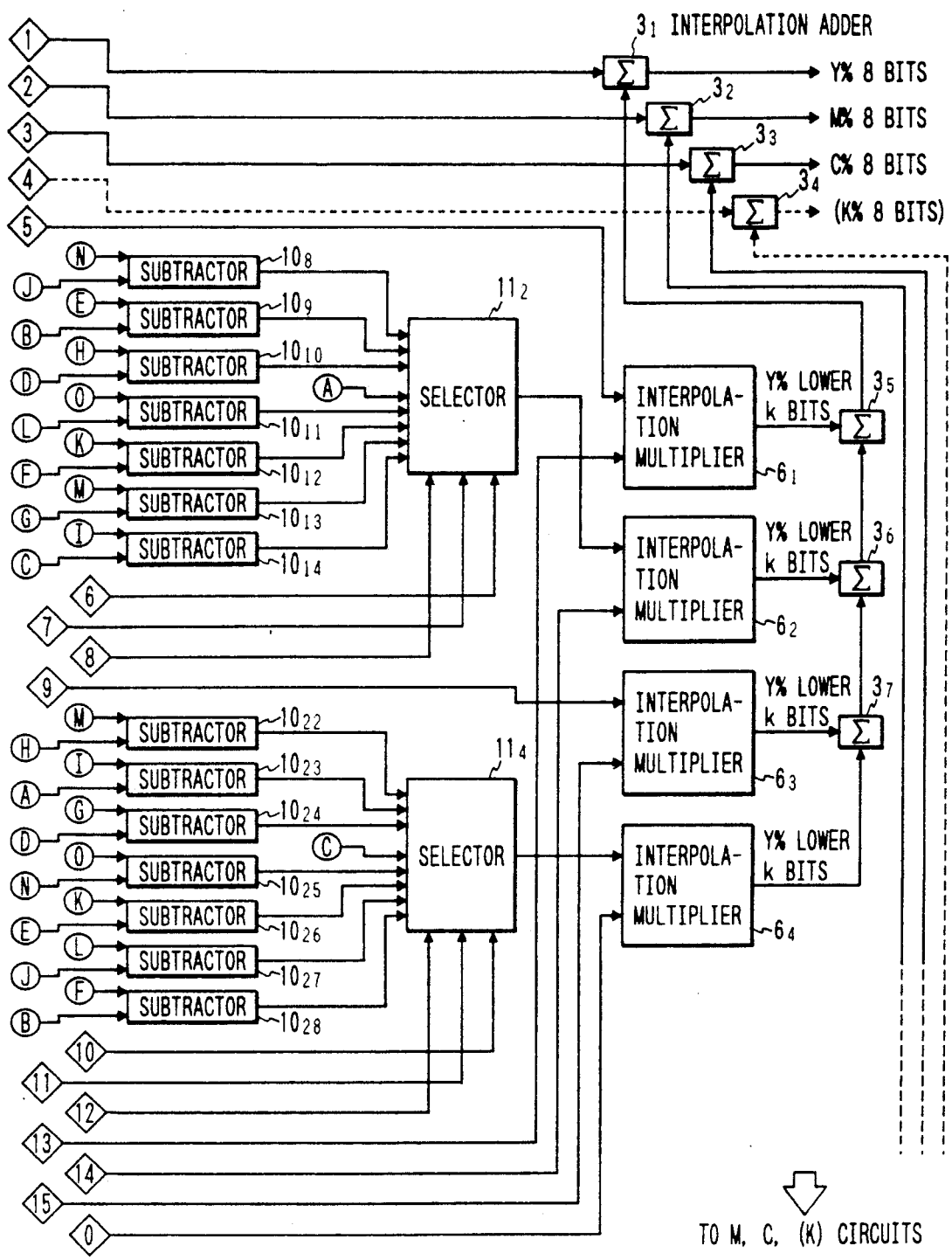
FIG. 6b is a block diagram showing a color signal transforming circuit according to the fifth embodiment.

FIG. 6 is a block diagram showing the arrangement of a fifth embodiment of the present invention.

The fifth embodiment is substantially equal to the second embodiment except that except that the interpolation sensitivity signal output memories 5 are substituted by interpolation sensitivity signal output means made up of an interpolation difference signal output memory $9_1$, a plurality of subtractors $10_1$ to $10_{28}$, and a plurality of selectors 11.

The combination of the interpolation sensitivity signal output means is provided for the dividing method of FIG. 1 and Table 1. When the memory capacity of the interpolation sensitivity signal output memories is compared with that of the interplation difference signal output memory 9, 32 : 15 when the numbers of the higher bits of the input signals are equal to one another. Therefore, as the number of the higher bits is increased, the fifth embodiment is more effectively operable.

The interpolation difference signal output memory $9_1$ is a look-up table memory which receives the higher bits of the K control signal and the input signals L*, a*, and b* as an address signal. In response to the address signal, the memory produces difference data corresponding to fifteen lattice points as the remaining lattice points when one of the sixteen lattice points of each 16-vertex body as the interpolated region is a reference point. The output signals of the output memory 9 are applied to the subtractors $10_1$ to $10_{28}$ which form a plurality of interpolation sensitivity output signals. The interpolation sensitivity signals are applied to the selectors $11_1$ to $11_4$. In response to interpolation region select signals, the selectors $11_1$ to $11_4$ select the interpolation sensitivity output signals of the corresponding interpolation regions, respectively.

It is evident to those skilled in the art that in the fifth embodiment, the interpolation region select signal output memory may be used in place of the comparators $8_1$ to $8_6$, although not illustrated.

6TH EMBODIMENT

Figure 7A:
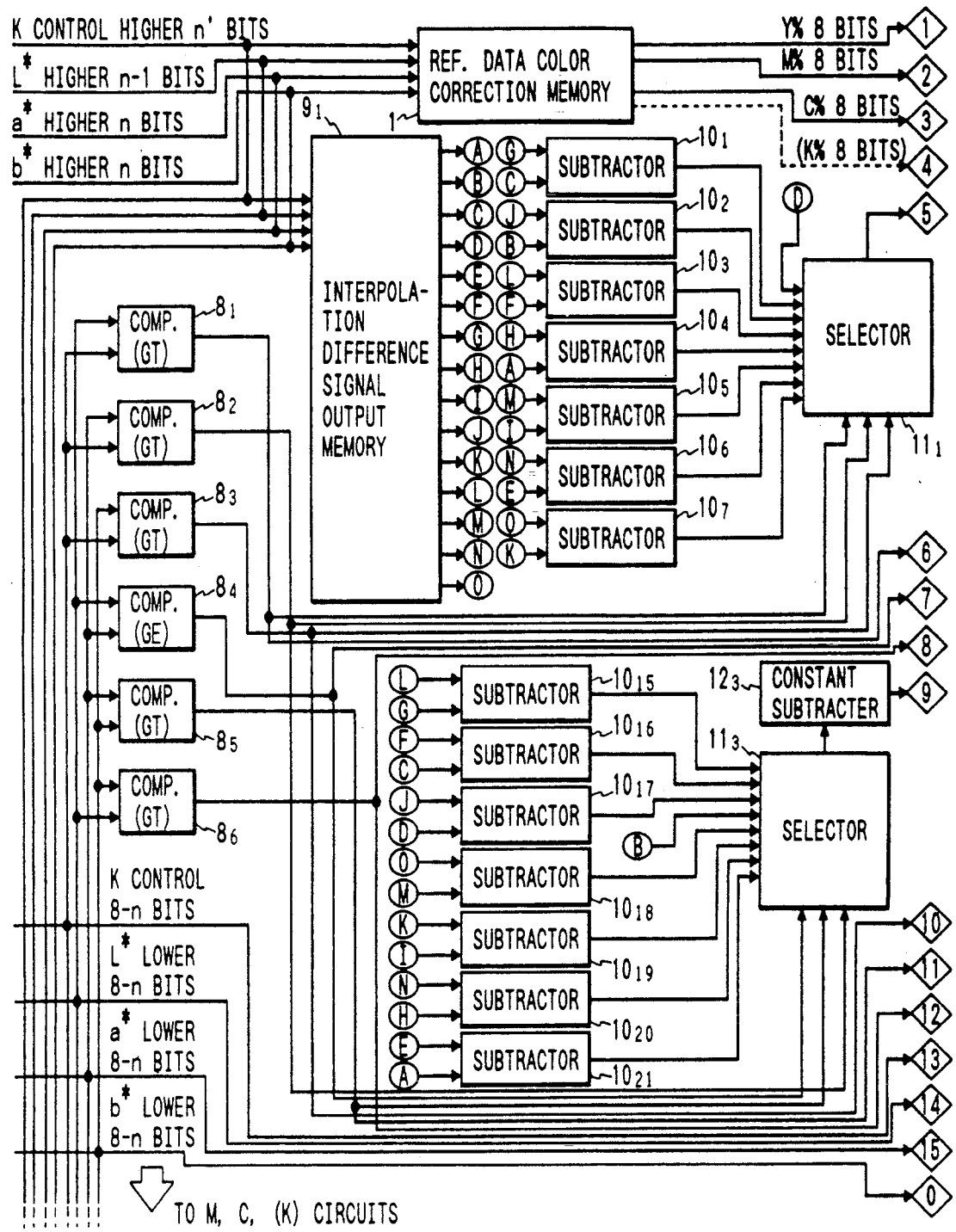
FIG. 7a is a block diagram showing a color signal transforming circuit according to a sixth embodiment of the present invention, the figure cooperating with FIG. 7b to form a single drawing.
Figure 7B:
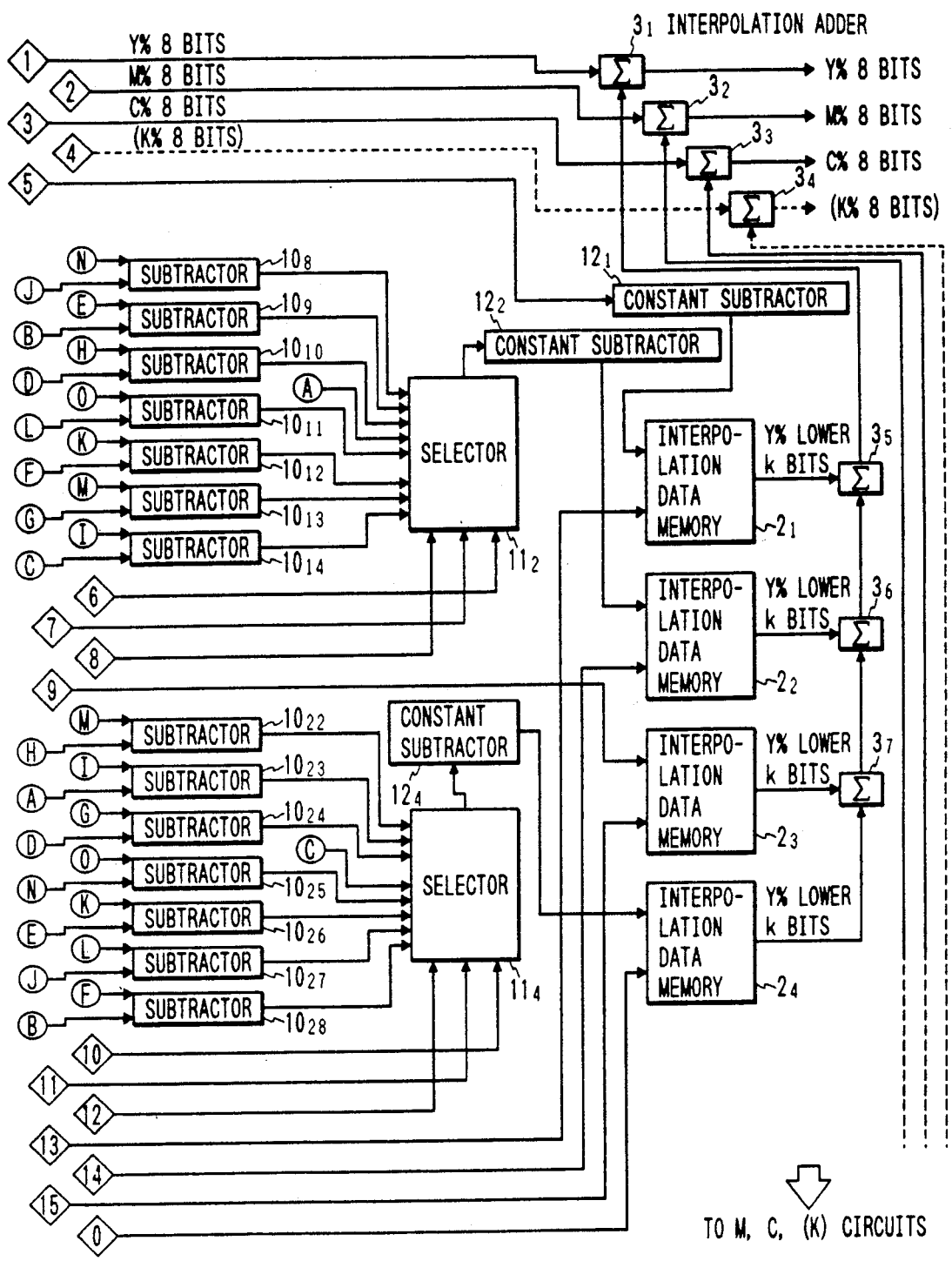
FIG. 7b is a block diagram showing a color signal transforming circuit according to the sixth embodiment.

FIG. 7 is a block diagram showing the arrangement of a sixth embodiment of the present invention.

The sixth embodiment is substantially equal to the third embodiment except that the interpolation sensitivity signal output memories 5 are substituted by interpolation sensitivity signal output means made up of an interpolation difference signal output memory $9_1$, a plurality of subtractors $10_1$ to $10_{28}$, a plurality of selectors $11_1$ to $11_4$, and a plurality of constant subtractors $12_1$ to $12_4$.

The interpolation sensitivity signal output means of the fifth embodiment is different from the interpolation sensitivity select signal output means of the sixth embodiment in that the latter has the plurality of constant subtractors $12_1$ to $12_4$. In the sixth embodiment, the look-up table memories are used in place of the multipliers. Accordingly, the output signals of the selectors are not the interpolation sensitivity signals, but address signals to address the look-up table memories storing the interpolation data corresponding to the interpolation sensitivity signals. To this end, the constant subtractors are provided to transform the interpolation sensitivity signals to the interpolation sensitivity select signals.

The arrangement and functions of other circuit components than the constant subtractors are substantially the same as those of the third or fifth embodiment.

7TH EMBODIMENT

Figure 8:
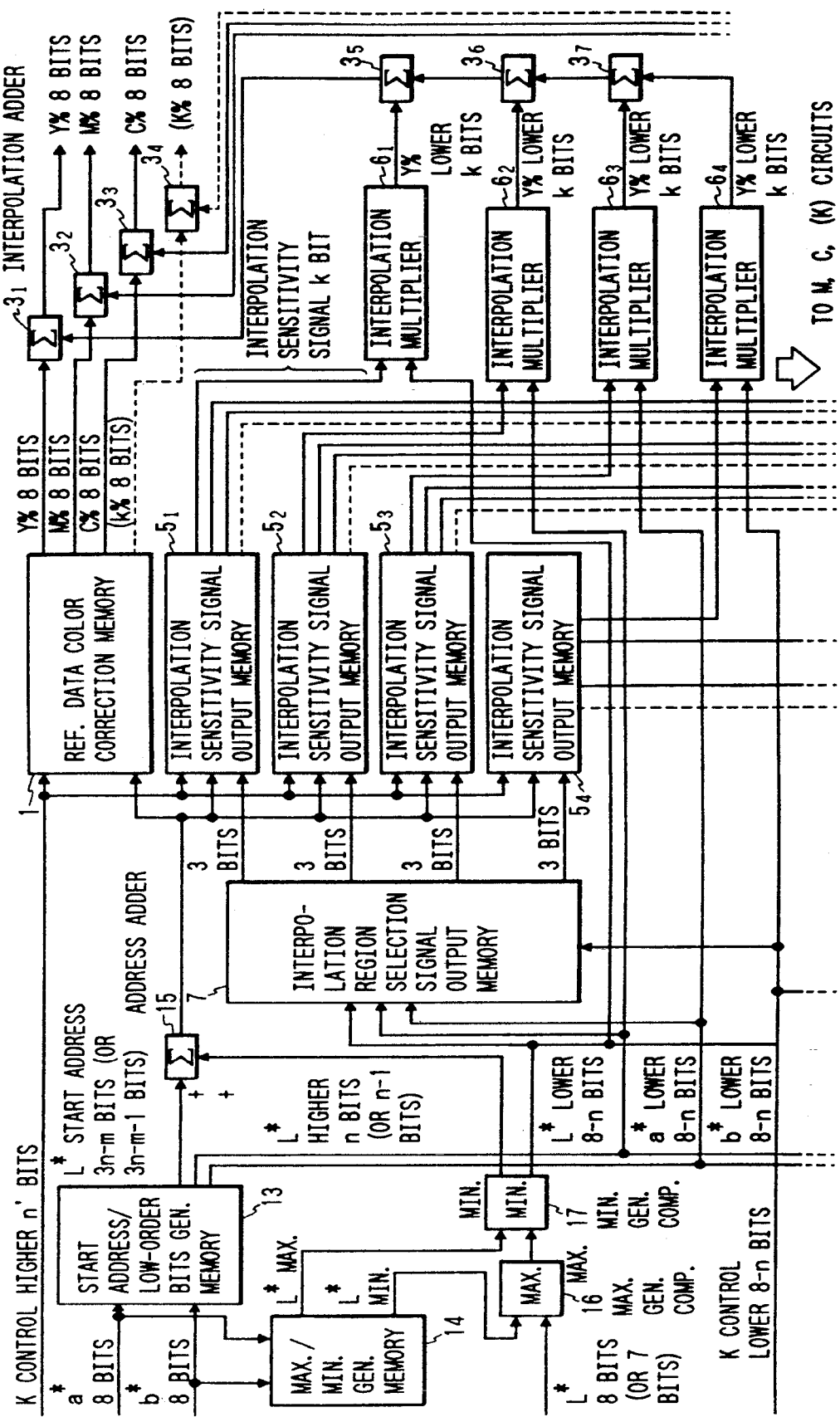
FIG. 8 is a block diagram showing a color signal transforming circuit according to a seventh embodiment of the present invention.
Figure 9:
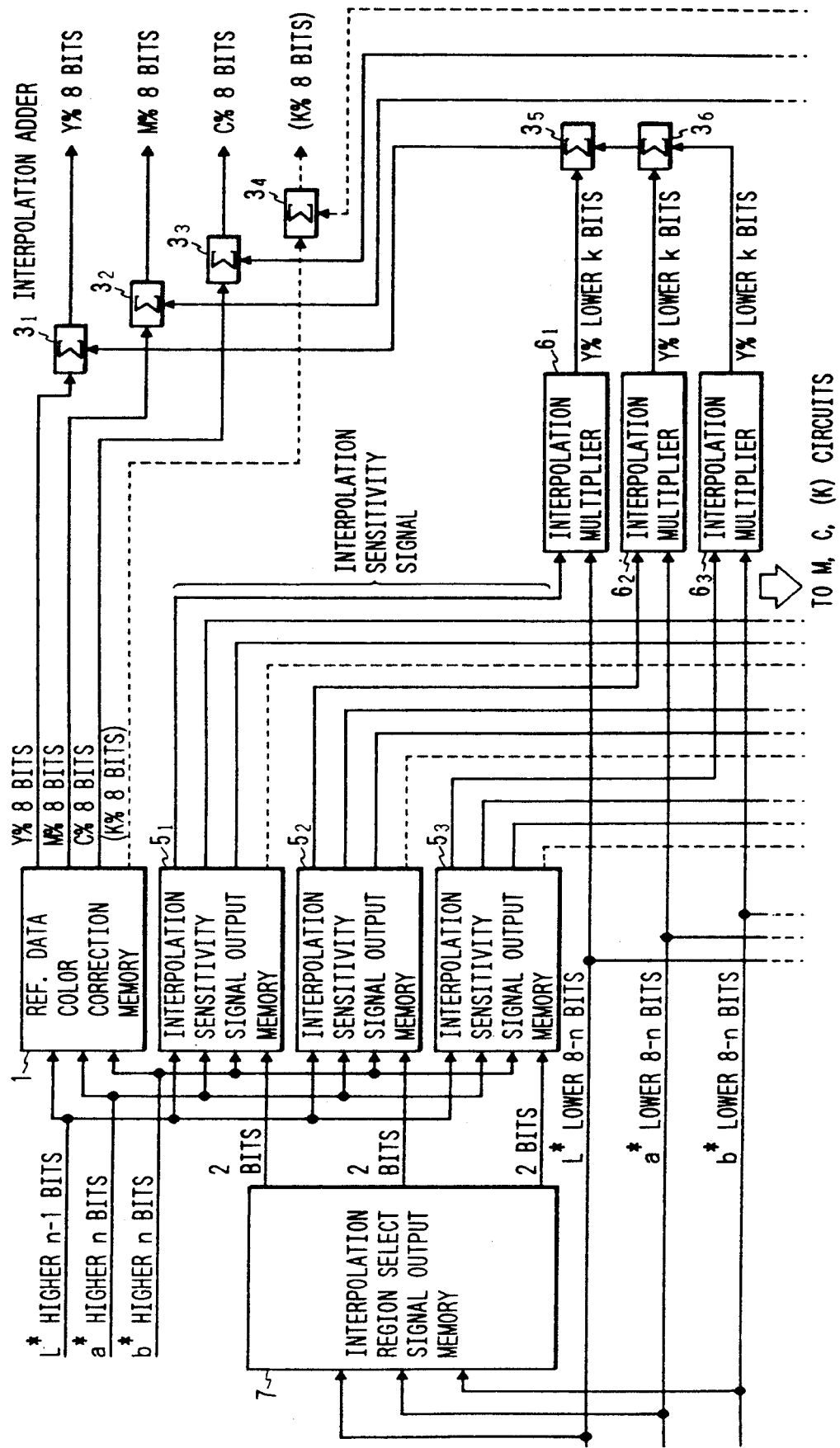
FIG. 9 is a block diagram showing an interpolation circuit to be improved.
Figure 10:
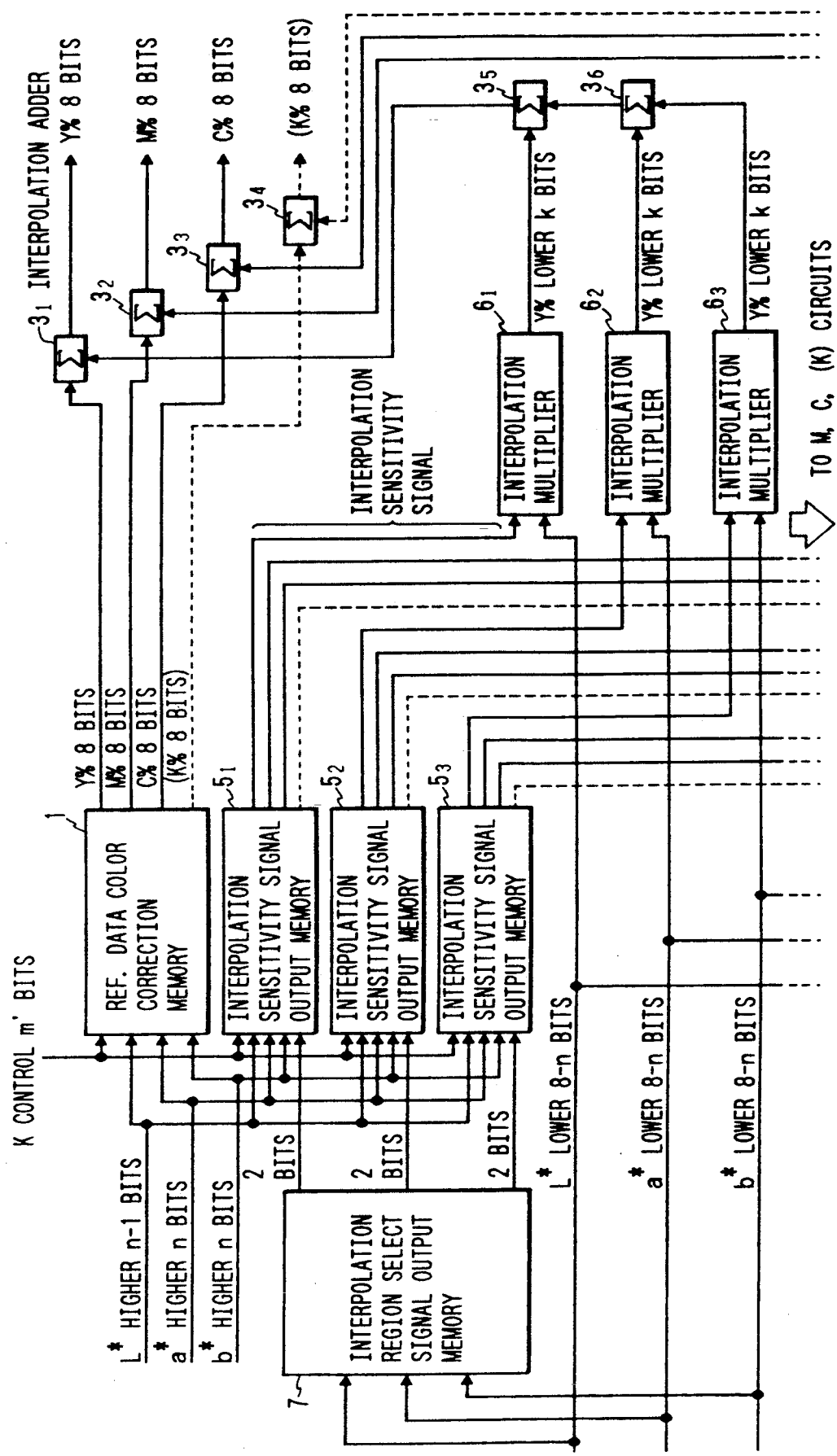
FIG. 10 is an explanatory diagram showing a modification of the FIG. 9 circuit.

FIG. 8 is a block diagram showing the arrangement of an application example as an eighth embodiment of the present invention.

The embodiment of FIG. 8 is the combination of the first embodiment and the technique to remove the memory portion out of the color reproduction range of the output by irregularly rearranging the data that are regularly arranged (Published Unexamined Japanese Patent Application No. Hei. 2-187374). As a matter of course, it may be combined with another embodiment of the present invention.

As seen, the arrangement of the first embodiment follows the combination of a start address/lower bits generating memory 13, a maximum/minimum generating memory 14, an address adder 15, a maximum generator/comparator 16, and a minimum generator/comparator 17.

The outline of the additional combination will be described, and for details of it, reference is made to Published Unexamined Japanese Patent Application No. Hei. 2-187374.

The start address/lower bits generating memory 13 sets the input signals a and b out of the color reproduction range of the output within the color reproduction range of the output, with the same hue. And the memory produces a start address of the input signal L and the lower bits of the input signals a and b, after being set within the color reproduction range of the output.

The maximum/minimum generating memory 14 produces the maximum and minimum values of the signal L. corresponding to the input signals a and b. With the circuit arrangement including the memory, the maximum generator/comparator 16 and the minimum generator/comparator 17, the output signals of the memory 14 undergoes comparison with the input signal L. When the input signal L. is out of the color reproduction range of the output, the combination sets it within the output color reproduction range.

The address adder 15 adds the start address of the signal L. and a value of the higher bits of the signal L. that is set within the color reproduction range of the output. As a result, it produces a new address of the basic data color correction memory 1 and the interpolation sensitivity signal output memories 4.

With cooperation of the start address of the signal 1, and the address adder 15, it is possible to remove the portions of the color correction memory 1 and the interpolation sensitivity signal output memories 4 which corresponds to the input signals out of the color reproduction range of the output device. Therefore, the memory capacities of the color correction memory 1 and interpolation sensitivity signal output memories 4 can be reduced.

In a method of transforming color signals according to the present invention, a 16-vertex body of each object to be interpolated is divided into twenty-four 5-vertex bodies each passing through one of sixteen lattice points constituting the 16-vertex body, and the different combinations of interpolation data are assigned to the 5-vertex bodies in one-to-one correspondence manner. Accordingly, the complicated address conversion is not required when the memory is accessed. High speed processing is possible with a simple circuit arrangement. Additionally, a high speed color conversion is realized for four input signals including three color signals and a control signal for K, without increasing the memory capacity not so much. Further, the regular arrangement of data in the color correction memory is not essential in the color signal transforming apparatus of the first embodiment. Therefore, the color signal transforming apparatus accepts use of the technique to remove the memory out of the color reproduction range by irregularly rearranging the data that are regularly arranged in the color correction memory. Additionally, the continuity at the boundary between the adjacent interpolation regions can be secured.

A color signal transforming apparatus of the present invention includes means, i.e., interpolation sensitivity output memory means, interpolation sensitivity select output memory means, interpolation sensitivity output means, or interpolation sensitivity select output means, for dividing a 16-vertex body of each object to be interpolated into twenty-four 5-vertex bodies each passing through one of sixteen lattice points constituting the 16-vertex body, and for assigning the different combinations of interpolation data to the 5-vertex bodies in one-to-one correspondence manner. With provision of the memories, there is no need for the complicated address conversion which is required when the reference values are read out of the color correction memory. Accordingly, the color signal transforming apparatus that is simple in construction and operable at high speed is provided. A high speed color conversion is realized for four input signals including three color signals and a control signal for K, without increasing the memory capacity not so much. Since the regular arrangement of data in the color correction memory is not essential in the color signal transforming apparatus, the color signal transforming apparatus accepts use of the technique to remove the memory out of the color reproduction range by irregularly rearranging the regularly arranged data as disclosed in Japanese Patent Laid-Open Publication Nos. Hei. 2-73779 and 2-187374. Additionally, the continuity at the boundary between the adjacent interpolation regions can be secured.

The color signal transforming apparatus of the present invention includes the interpolation region select memory means and interpolation region select signal output means or interpolation data output means or interpolation data output memory means. With provision of the memories, the number of required calculations on the output data can be reduced, and the apparatus is operable at high speed, with a simple circuit construction.

The present invention may includes a memory portion, which produces difference data corresponding to fifteen lattice points as the remaining lattice points when one of the sixteen lattice points of each 16-vertex body as the interpolated region is a reference point. Use of such a memory provides an interpolation method enjoying the above-mentioned effects with the memory capacity as small as possible, although the number of calculations is slightly increased.

What is claimed is:

1. A method for transforming color signals in which each of four input signals is divided into the higher bits and the lower bits, so that the higher bits are combined to form basic data and the combined higher bits and lower bits are combined to form interpolation data, and the combination of the higher bits and the interpolation data are calculated together to produce output signals, comprising the steps of dividing a 16-vertex body of each object to be interpolated into twenty-four 5-vertex bodies each passing through one of sixteen lattice points constituting the 16-vertex body, and assigning the different combinations of interpolation data to the 5-vertex bodies in one-to-one correspondence manner.

2. An apparatus for transforming color signals having four input signals representative of colors being each divided into the lower bits and the higher bits, comprising:

basic data color correction memory means for producing basic data, when receiving an address signal as the combination of the higher bits;

interpolation data generating means for generating the combinations of interpolation data in accordance with the combination of the higher bits and the combination of the lower bits; and adder means for adding the output signal of said color correction memory means and the output signal of said interpolation data generating means to thereby produce an output signal, said interpolation data generating means including means for dividing a 16-vertex body of each object to be interpolated into twenty-four 5-vertex bodies each passing through one of sixteen lattice points constituting the 16-vertex body, and for assigning the different combinations of interpolation data to the 5-vertex bodies in one-to-one correspondence manner.

3. The color signal transforming apparatus according to claim 2 wherein said interpolation data generating means comprises interpolation region select memory means for outputting a plurality of interpolation region select signals that are fit to the commonness of the interpolation sensitivity signals, with the combination of the lower bits as an address signal, to specify which of the twenty-four 5-vertex bodies contains each said input signal.

4. The color signal transforming apparatus according to claim 2 wherein said interpolation data generating means comprises a plurality of comparators for comparing the lower bits of the four input signals or some shifted lower bits of the four input signals, to specify which of the twenty-four 5-vertex bodies contains each said input signal, and means for producing the combinations of the output signals of said comparators in the form of a plurality of interpolation region select signals that are fit to the commonness of the interpolation sensitivity signals.

5. The color signal transforming apparatus according to claim 2 wherein said interpolation data generating means comprises interpolation sensitivity output memory means for producing a plurality of interpolation sensitivity signals in response to address signals consisting of the combination of the higher bits of the four input color signals and some of the interpolation region select signals, and a plurality of interpolation data output means for producing interpolation data by multiplying one of the output signals of said interpolation sensitivity output memory means by the lower bit of one of the four input color signals.

6. The color signal transforming apparatus according to claim 2 wherein said interpolation data generating means comprises interpolation sensitivity select output memory means for producing a plurality of interpolation sensitivity signals in response to address signals including the combination of the higher bits of the four input color signals and some of the interpolation region select signals, and a plurality of interpolation data output memory means for producing interpolation data in response to an address signal including one of the output signals of said interpolation sensitivity select output memory means and the lower bit of one of the four input color signals.

7. The color signal transforming apparatus according to claim 2 wherein said interpolation data generating means comprises interpolation sensitivity output means containing a memory portion for producing difference data corresponding to fifteen lattice points as the remaining lattice points when one of the sixteen lattice points of each 16-vertex body as the interpolated region is a reference point, in response to an address signal as the combination of the higher bits of the four input color signals, a plurality of subtractor portions for calculating the difference between the difference data, and a portion for selecting a plurality of proper interpolation sensitivity output signals from among the difference data or the subtraction results by using some of the interpolation region select signals, and a plurality of interpolation data output means for outputting interpolation data by multiplying one of the output signals of said interpolation sensitivity output means by the lower bit of one of the four input signals.

8. The color signal transforming apparatus according to claim 2 wherein said interpolation data generating means comprises interpolation sensitivity select output means containing a memory portion for producing difference data corresponding to fifteen lattice points as the remaining lattice points when one of the sixteen lattice points of each 16-vertex body as the interpolated region is a reference point, in response to an address signal as the combination of the higher bits of the four input color signals, a plurality of subtractor portions for calculating the difference between the difference data, a portion for selecting a plurality of proper interpolation sensitivity output signals from among the difference data or the subtraction results by using some of the interpolation region select signals, and portions for transforming the plurality of selected interpolation sensitivity output signals into a plurality of interpolation sensitivity select signals, and a plurality of interpolation data output memory means for outputting interpolation data in response to an address signal containing one of the output signals of said interpolation sensitivity select output means and the lower bit of one of the four input signals.

9. A color signal transforming apparatus comprising:
a start address/lower bit generating memory for receiving an address signal containing first and second input signals of four input signals representative of a first calorimetric coordinate to produce a start address previously set with consideration of a color reproduction range of an output device and the modified lower bits of the two input signals;

maximum/minimum generating means for receiving an address signal containing said first and second input signals to generate the maximum and minimum values of a third input signal of the four input signals, with consideration of the color reproduction range of the output device;

calculating means for modifying said third input signal using the maximum and minimum values output from said maximum/minimum generating means;

an address adder for adding the start address output from said start address/lower bit generating memory and the higher bit of a fixed number of the modified result from said calculating means;

a basic data color correction memory for producing basic data signals representative of colors of a second calorimetric coordinate in response to an address signal as the output signal of said address adder and a fourth input signal of the four input signals;

interpolation data generating means for generating a set of interpolation data on the basis of the combination of the higher bits output from said address adder and the combination of the modified lower bits of said input signals; and adder means for producing output signals representative of colors of the second calorimetric coordinate by adding the output signal of said basic data color correction memory and the output signal of said interpolation data generating means;

said interpolation data generating means including means for dividing a 16-vertex body of each object to be interpolated into twenty-four 5-vertex bodies each passing through one of sixteen lattice points constituting the 16-vertex body, and for assigning the different combinations of interpolation data to the 5-vertex bodies in one-to-one correspondence manner.

* * * * *